United States Patent
Sprouse et al.

(10) Patent No.: US 12,360,672 B2
(45) Date of Patent: Jul. 15, 2025

(54) MEMORY DIE WITH ON-CHIP BINARY VECTOR DATABASE SEARCH

(71) Applicant: Western Digital Technologies, Inc., San Jose, CA (US)

(72) Inventors: Steven T. Sprouse, San Jose, CA (US); Yan Li, Milpitas, CA (US); Frank W. Tsai, Palo Alto, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/526,698

(22) Filed: Dec. 1, 2023

(65) Prior Publication Data

US 2025/0181242 A1    Jun. 5, 2025

(51) Int. Cl.
    *G06F 3/06*      (2006.01)

(52) U.S. Cl.
    CPC ............ *G06F 3/061* (2013.01); *G06F 3/0659* (2013.01); *G06F 3/0679* (2013.01); *G06F 2212/7207* (2013.01)

(58) Field of Classification Search
    CPC ...... G06F 3/061; G06F 3/0659; G06F 3/0679; G06F 2212/7207
    See application file for complete search history.

(56) References Cited

U.S. PATENT DOCUMENTS

| | | | |
|---|---|---|---|
| 8,634,247 B1 | 1/2014 | Sprouse et al. | |
| 8,780,634 B2 | 7/2014 | Li et al. | |
| 11,410,727 B1 * | 8/2022 | Hoang | G11C 16/3404 |
| 2014/0133233 A1 | 5/2014 | Li et al. | |

* cited by examiner

*Primary Examiner* — Kalpit Parikh
(74) *Attorney, Agent, or Firm* — LOZA & LOZA, LLP; Gabriel Fitch

(57) ABSTRACT

A data storage device is configured to store a database of objects in an NVM die as binary vectors and to then search the database based on binary key vectors. The binary vectors may be received from a host for storage in the NVM die. In other examples, a data storage controller converts floating-point vectors received from the host into binary vectors for storage in the NVM die. Various procedures are described for converting the floating-point vectors into binary vectors. Exemplary procedures are also described for comparing a binary key vector received from the host with the binary vectors stored in the NVM die to detect matches. For example, a sequence of commands is described for applying by the data storage controller to the NVM die to control the die to identify and count matching bits using the latches of the NVM die. Volatile memory implementations are also described.

31 Claims, 27 Drawing Sheets

MEMORY DIE WITH ON-CHIP BINARY VECTOR DATABASE SEARCH

FIELD

The disclosure relates, in some aspects, to memory devices such as non-volatile memory (NVM) arrays. More specifically, but not exclusively, the disclosure relates to on-chip vector database search features implemented within a die of an NVM array.

INTRODUCTION

Vector databases are often used in artificial intelligence (AI) applications, search applications, and the like. Generally speaking, vector databases map objects such as images, text, or files to vectors (e.g., floating-point, integer, etc.), which may have hundreds or thousands of dimensions. A vector database operation may, for example, involve receiving a key vector and then finding other vectors that are the same or similar to the key vector by searching the vector database. This may be done by computing the Euclidean distance between two vectors represented by floating-point numbers. Conventionally, floating-point vector database searches are performed using central processing units (CPUs) or graphics processing units (GPUs). Given the large size of vector databases and the use of floating-point numbers to represent the vectors, such searches may be computationally slow and, if the database is maintained in an NVM array, significant bandwidth may be needed to transfer the data from the NVM array to the CPU/GPU for processing. This may result in higher costs, limited scalability, and higher power consumption.

It would be desirable to provide improvements in vector database searches and it is to this end that at least some aspects of the present disclosure are directed.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage device that includes: a die comprising non-volatile memory (NVM); and a data storage controller coupled to the die, the data storage controller comprising one or more processors configured to: store objects within the NVM of the die as binary vectors, the binary vectors being placed in bitlines of the NVM; obtain a binary key vector representative of a particular object to search for within the binary vectors stored on the NVM of the die; and search for the particular object within the binary vectors stored in the NVM.

Another embodiment of the disclosure provides a method for use by a data storage controller of a data storage device having a die with an NVM. The method includes: storing objects within the NVM of the die as binary vectors; obtaining a binary key vector representative of a particular object to search for within the binary vectors stored on the NVM of the die; and searching for the particular object within the binary vectors stored in the NVM.

Yet another embodiment of the disclosure provides a device that includes: a die comprising NVM; and one or more processors formed on the die and configured to: store objects within the NVM as binary vectors; receive signals from a data storage controller representative of a particular object to search for within the binary vectors; and search for the particular object within the binary vectors stored in the NVM.

Still another embodiment of the disclosure provides a method for use by a die having an NVM, the method comprising: storing objects within the NVM as binary vectors; receiving signals from a data storage controller representative of a particular object to search for within the binary vectors; and searching for the particular object within the binary vectors stored in the NVM.

A further embodiment of the disclosure provides an apparatus for use with a die having NVM. The apparatus includes: means for storing objects within the NVM of the die as binary vectors; means for obtaining a binary key vector representative of a particular object to search for within the binary vectors stored in the NVM of the die; and means for searching for the particular object within the binary vectors stored in the NVM of the die.

BRIEF DESCRIPTION OF THE DRAWINGS

FIG. 11A illustrates a first table of logic operations and exemplary latch values for comparing bits of a binary key vector to a stored binary vector while counting matching bits, according to aspects of the present disclosure.

FIG. 11B illustrates a second table of logic operations and exemplary latch values for comparing bits of a binary key vector to a stored binary vector while counting matching bits, according to aspects of the present disclosure.

FIG. 11C illustrates a third table of logic operations and exemplary latch values for comparing bits of a binary key vector to a stored binary vector while counting matching bits, according to aspects of the present disclosure.

DETAILED DESCRIPTION

Figure 1:
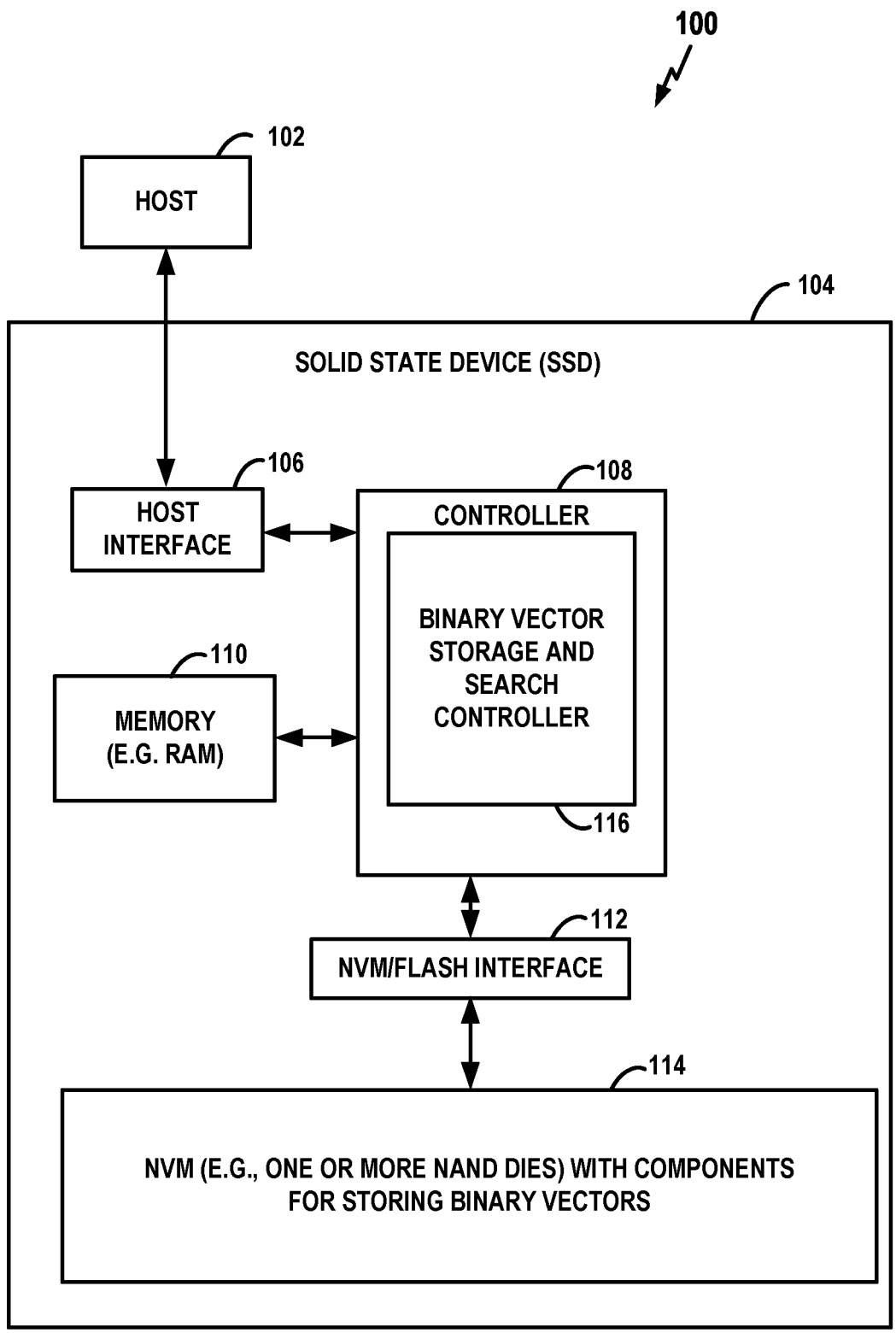
FIG. 1 is a schematic block diagram configuration for an exemplary solid state device (SSD) having one or more non-volatile memory (NVM) array dies, where the dies have components for storing, and searching binary vectors, according to aspects of the present disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to non-volatile memory (NVM) arrays, and to data storage devices or apparatus for controlling the NVM arrays, such as a controller of a data storage device (such as an SSD), and in particular to NAND flash memory storage devices (herein "NANDs"). (A NAND is a type of non-volatile storage technology that does not require power to retain data. It exploits negative-AND, i.e., NAND, logic.) For the sake of brevity, an SSD having one or more NVM NAND dies will be used below in the description of various embodiments. It is understood that at least some aspects described herein may be applicable to other forms of data storage devices as well. For example, at least some aspects described herein may be applicable to phase-change memory (PCM) arrays, magneto-resistive random access memory (MRAM) arrays and resistive random access memory (ReRAM) arrays. Features may be implemented within a CMOS direct bonded (CBA) NAND chip or die (wherein CMOS refers to a complementary metal-oxide-semiconductor).

In addition to data storage devices, the NVM arrays (and associated circuitry and latches, where appropriate) in various described embodiments may be implemented as part of memory devices such as dual in-line memory modules (DIMMs) or other types of memory components/modules in some embodiments. Such memory devices may be accessible to a processing component such as a Central Processing Unit (CPU) or a Graphical Processing Unit (GPU). The links between processing components to such memory devices may be provided via one or more memory or system buses, including via interconnects such as Compute Express Link (CXL), Gen-Z, OpenCAPI, NVLink/NVSwitch, Infinity Fabric, Omni-Path and other similar interconnect protocols. In other embodiments, the links between processing components to memory devices may be provided via on-die or die-to-die interconnects. In certain embodiments, the NVM arrays and associated circuitry and latches may be co-located on the same die as the processing components such as CPU or GPU.

Overview

As noted above, vector database searches such as for objects may be computationally slow and, if the database is maintained in an NVM array, significant bandwidth may be needed to transfer the data from the NVM array to the CPU/GPU for processing. One issue is that the vectors are usually stored horizontally (i.e., along wordlines) in the NVM array. Herein, in some aspects, a data storage controller is provided with components to convert floating-point vectors (e.g., received from a host) that represent objects into binary vectors for storage vertically within the bitlines of the NAND blocks of a NVM die as a searchable binary vector database. In other examples, the host might provide the binary vectors. Techniques are provided to search the binary vector database for objects based on a binary key vector. (An initial floating-point key vector, received from a host, may be converted into a binary key vector by the data storage controller for searching or the host may provide the binary key vector). By storing and processing the data as binary vectors rather than floating-point vectors, high-speed processing can be achieved, especially by exploiting the parallelism of a multi-die NAND array. Moreover, large amounts of data need not be transferred between a data storage controller and the NAND array or between the storage controller and the host.

In some examples, the data storage controller initially receives a database of floating-point vectors representing a variety of objects generated by an artificial intelligence (AI) system with a host, e.g., a generative AI system. The data storage controller converts the database of floating-point vectors into a database of binary vectors for storage in the NAND. In other examples, other numerical data representations may be input by the data storage controller, such as fixed-point vector data. In still other examples, the data storage controller may receive a database of objects in some non-vector representation and then convert the objects to floating-point vectors before further converting the objects to binary vectors. In still other examples, the host converts the floating-point vectors provided by an AI system to binary vectors and sends the binary vectors to the data storage controller.

Various procedures are described herein for use by the data storage controller (or a host) to convert floating-point vectors to binary vectors, including: threshold, discrete range, continuous range, overlap or overlapping range, weighted discrete range, and weighted continuous range procedures. In some examples, the NVM die itself may be configured to perform the conversion (if equipped with suitable on-die circuitry).

Various procedures are also described herein for comparing a binary key vector with binary vectors read from bitlines of the NAND blocks to assess similarity. For example, each bit of a binary key vector may be compared with each corresponding bit of a binary vector sensed from the bitlines of the NAND. For each matching bit, a counter may be incremented and compared to a threshold indicating a vector match. In other examples, a randomly selected subset of the bits of the key vector are compared with corresponding bits from the bitlines. In still other examples, only bits that are '1's in the key vector are compared with corresponding bits from the bitlines (or only bits that are '0's in the key vector are compared with corresponding bits from the bitlines).

Various techniques are described for comparing a binary key vector to a binary vector stored in the NVM array of a die to determine if there is a match. In one example, the data storage controller maintains the binary key vector in its memory and generates a sequence of signals or commands for sending to the die. The commands are configured to cause the die to determine whether bits within the binary key vector match corresponding bits within one or more of the binary vectors of the NVM array. The data storage controller then receives a notification from the die indicating a match between the binary key vector and one or more of the binary vectors of the NVM array. For example, the sequence of commands may comprise a sequence of logic commands configured to cause the die to perform one or more exclusive NOR (XNOR) operations or other logic operations on the bits of a bitline storing a binary vector, which have the effect of comparing a bit of the binary key vector with a corresponding bit in the bitline for a match. That is, the sequence of commands is configured to provide an implicit '0' or '1' that is applied to the bits of the bitline to determine if the bit line has a corresponding '0' or '1'. This is explained in detail below. The sequence of commands may be implemented, e.g., as a sequence of "test" commands applied on a test connection line between the data storage controller and the NVM die. This technique offers the advantage of being able to perform the binary vector search without requiring significant (if any) changes to an existing NVM die.

In other examples, depending upon the capabilities of the NVM die, a single instruction may be provided by the data storage controller that instructs the NVM die to perform the entire sequence of commands. In still other examples, the data storage controller may be configured to explicitly send a '0' or '1' to the NVM die, rather than commands to implicitly provide the '0' or '1'. In still other examples, the data storage controller sends the entire binary key vector to the NVM die, which stores the binary key vector in a latch for comparison against bitlines of the NVM array. This may be implemented by providing the NVM die with under-the-array circuitry to perform the comparison.

In some aspects, to determine whether there is a match between a binary key vector and a stored binary vector, one or more counters are used to accumulate a value on the NVM die representative of a match. If so, procedures are provided to detect if the counters overflow and to respond accordingly. Procedures are also provided to enable the counting and comparing of match results using minimal on-chip circuitry, such as by using relatively few die latches without separate on-chip counters. Exemplary sequences of signals or commands are provided herein to implement the aforementioned logic operations and the counters (e.g., per-bit counters) using NAND logic circuitry and NAND data latches that are typically used for memory operations.

In some aspects, a match between a binary key vector and a binary vector in the stored database may be determined based on a Euclidean distance. In other examples, other similarity measures are used, such as cosine, dot product, or Jaccard similarity.

In some aspects, the binary vector data may be stored in bitlines formed of single-level cells (SLC). In other examples, multi-level cells (MLC) may be used. In either case, the binary vectors need not occupy an entire bit-line. The binary vectors may span multiple blocks or fractions of blocks and need not be aligned to the start of a bit-line. (The vectors should occupy the same plane and bitline so that matching bits are accumulated in the same counter.)

Exemplary SSD Implementation with NVM Array for Storing and Searching Binary Vectors FIG. 1 is a block diagram of a system 100 including an exemplary SSD (or computational storage device (CSD)) having a data storage controller with components for converting non-binary vectors (e.g., floating-point vectors) into binary vectors and an NVM array for storing the binary vectors and searching the binary vectors in accordance with aspects of the disclosure. The NVM may also store other data such as user data.

The system 100 includes a host 102 and an SSD 104 coupled to the host 102. The host 102 provides commands to the SSD 104 for transferring data between the host 102 and the SSD 104. For example, the host 102 may provide a write command to the SSD 104 for writing user data to the SSD 104 or a read command to the SSD 104 for reading user data from the SSD 104. The host 102 may be any system or device having a need for data storage or retrieval and a compatible interface for communicating with the SSD 104. For example, the host 102 may be a computing device, a personal computer, a portable computer, a workstation, a server, a personal digital assistant, a digital camera, or a digital phone as merely a few examples. Additionally or alternatively, the host 102 may be a system or device having a need for image processing, such as computer vision for use in self-driving vehicles, natural language processing, or other types of object-oriented processing.

The SSD 104 includes a host interface 106, a controller 108, a memory 110 (such as a random access memory (RAM)), an NVM interface 112 (which may be referred to as a flash interface), and an NVM 114, such as one or more NVM NAND dies. The controller 108 may be configured with components for converting floating point vectors to binary vectors. The NVM 114 may be configured with components for storing the binary vectors and searching the binary vectors. The host interface 106 is coupled to the controller 108 and facilitates communication between the host 102 and the controller 108. The controller 108 is coupled to the memory 110 as well as to the NVM 114 via the NVM interface 112. The host interface 106 may be any suitable communication interface, such as a Non-Volatile Memory Express (NVMe) interface, a Universal Serial Bus (USB) interface, a Serial Peripheral (SP) interface, an Advanced Technology Attachment (ATA) or Serial Advanced Technology Attachment (SATA) interface, a Serial Attached Small Computer System Interface (SCSI) (SAS), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link. Links between the host and the SSD may also be provided via one or more memory or system buses, including via interconnects as Compute Express Link (CXL), Gen-Z, OpenCAPI, NVLink/NVSwitch, Infinity Fabric, Omni-Path and other similar interconnect protocols.

The controller 108 controls the operation of the SSD 104. In various aspects, the controller 108 receives commands from the host 102 through the host interface 106 and performs the commands to transfer data between the host 102 and the NVM 114. Furthermore, the controller 108 may manage reading from and writing to memory 110 for performing the various functions effected by the controller and to maintain and manage cached information stored in memory 110. The controller 108 may include any type of processing device, such as a microprocessor, a microcontroller, an embedded controller, a logic circuit, software, firmware, or the like, for controlling the operation of the SSD 104. In some aspects, some or all of the functions described herein as performed by the controller 108 may instead be performed by another element of the SSD 104. For example, the SSD 104 may include a microprocessor, a microcontroller, an embedded controller, a logic circuit, software, firmware, or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The memory 110 may be any suitable memory, computing device, or system capable of storing data. For example, the memory 110 may be ordinary RAM, DRAM, double data rate (DDR) RAM (DRAM), static RAM (SRAM), synchronous dynamic RAM (SDRAM), flash storage, an erasable programmable read-only-memory (EPROM), an electrically erasable programmable ROM (EEPROM), or the like. In various embodiments, the controller 108 uses the memory 110, or a portion thereof, to store data during the transfer of data between the host 102 and the NVM 114. For example, the memory 110 or a portion of the memory 110 may be a cache memory. The NVM 114 receives data from the controller 108 via the NVM interface 112 and stores the data. The NVM 114 may be any suitable type of non-volatile memory, such as a NAND-type flash memory or the like.

In the example of FIG. 1, the controller 108 may include hardware, firmware, software, or any combinations thereof that provide a binary vector storage and search controller 116 with components for controlling the storage and searching of binary vectors in the NVM array 114. Note that the original floating-point vectors (from which the binary vectors are derived) may be generated by a generative AI system or other AI, neural network, or machine learning systems within the host 102, including systems intended to optimize large language model (LLM) performance, and then be converted to binary vectors by the host 102 for sending to the controller 116 for storage in the NAND array 202. The controller 116 may also include components for converting floating-point vectors to binary vectors if, for example, the host does not provide the binary vectors. In some embodiments, the dies of the NVM array 114 may be configured to perform the conversion using on-chip circuitry.

Although FIG. 1 shows an example SSD and an SSD is generally used as an illustrative example in the description throughout, the various disclosed embodiments are not necessarily limited to an SSD application/implementation. As an example, the disclosed NVM die and associated processing components can be implemented as part of a package that includes other processing circuitry and/or components. For example, a processor may include, or otherwise be coupled with, embedded NVM and associated circuitry and/or components for deep learning that are described herein. The processor could, as one example, offload certain tasks to the NVM and associated circuitry and/or components. As another example, the controller 108 may be a controller in another type of device and still include the binary vector storage and search controller 116 and perform some or all of the functions described herein.

Figure 2:
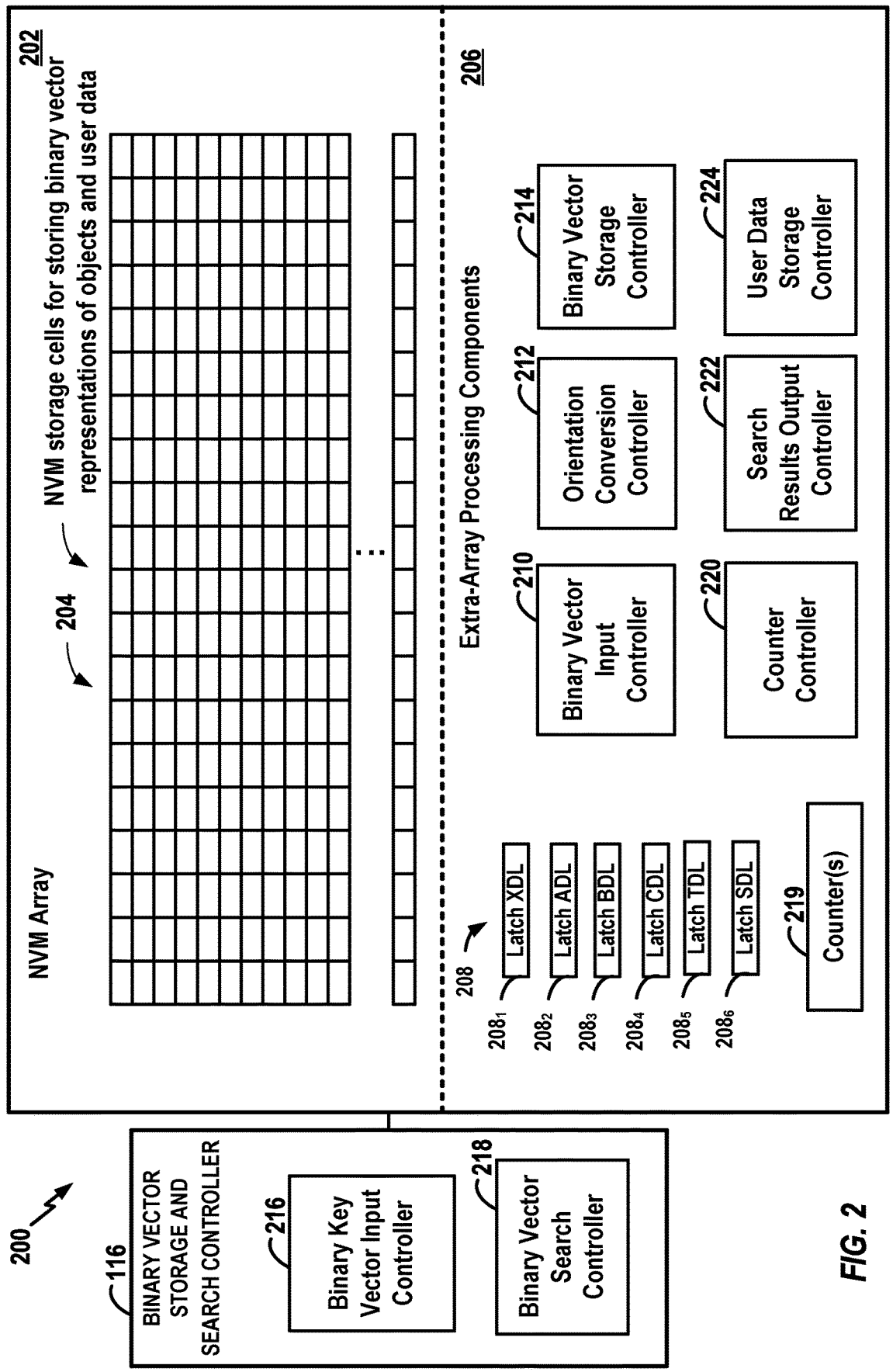
FIG. 2 illustrates an example of an NVM die having processing components configured for generating, storing, and searching binary vectors, according to aspects of the present disclosure.

FIG. 2 is a block diagram illustrating an exemplary NVM die 200 configured, e.g., for storing binary vectors and searching the binary vectors. The figure also shows selected components of the binary vector storage and search controller 116 of FIG. 1, which controls operations of the NVM die 200. In the example of FIG. 2, NVM die 200 includes a NAND storage array 202 that includes NAND storage cells 204 for storing binary vectors along bitlines and also for storing other data, such as user data. The binary vector data may consist of multidimensional binary vectors representing objects such as images, audio, or text.

The cells of the NAND array 202 may be arranged in bitlines, word lines, blocks, planes, or the like. In some examples, different partitions may be used, with the binary vectors stored in one partition and user data in another. The NVM die 200 also includes extra-array processing components 206, which are referred to herein as "extra-array" because they are not part of the array of NAND storage cells 204. The extra-array components 206 may be configured, for example, as under-the-array or next-to-the-array circuit components, and may include NVM NAND die latches (e.g., XDL, ADL, BDL, CDL, TDL, and SDL latches).

In the example of FIG. 2, the exemplary processing components 206 include a set of latches 208, specifically 2081, 2082, 2083, 2084, 2085, and 2086. (Note that, in some examples, the latches are part of a sense amplifier (which may be referred to as a "sense amp" and is not shown) connected to each bitline. In such cases, NAND array access may be achieved using a BLOCK/WL control, and with sense amp control of the bitline bias. The sense amp data pattern is obtained from the latches.) A binary vector input controller 210 is provided for inputting or receiving a database of objects represented as binary vectors from the controller 116. An orientation converter controller 212 is provided for converting horizontal vectors to vertical vectors for storing the vectors along the bitlines of the NAND wordlines, which may include striping the Nth dimension bit of every vector across the NAND wordlines. A binary vector storage controller 214 is provided for storing binary vectors in the NAND array 202. In this manner, a searchable database of binary vectors may be stored in the NAND array 202.

Within the binary vector storage and search controller 116, a binary key vector input controller 216 is provided for receiving or inputting a binary key vector from the host for searching within the binary vector database of objects in the NAND array 202. A binary vector search controller 218 performs and controls the search for stored vectors that match the key vector. For example, binary vector search controller 218 may generate and send a sequence of signals or commands to the die 200, with the sequence of commands configured to cause the components of the die 200 to determine whether bits within the binary key vector match corresponding bits within one or more of the binary vectors of the NVM array 202. The number of matching bits is accumulated for comparing against a threshold indicating a match.

Exemplary sequences of commands are described below, which perform the comparison and accumulate the results in the latches so that separate counters are not needed. Nevertheless, in some examples, one or more counters 219 are provided, which may be used to accumulate a count of matching bits for comparison to the threshold. The counters 219 are controlled by a counter controller 220. In some examples, dedicated counter circuits are used.

In some examples, a match is detected by determining whether one of more of the counters overflows (whether a latch-based counter or a dedicated counter circuit). A signal is sent to the controller 116 indicating the overflow to alert the controller 116 of a match. For example, the NVM die 200 may assert a status line to notify the controller 116. In other examples, a search results output controller 222 outputs search results to the controller 116, which may relay the results to a host, or the output controller 222 just indicates that a match has been found to enable the controller to then fetch the results of the search from the die 200.

Although not shown within FIG. 2, the processing components 206 may include various logic circuits such as OR circuits, AND circuits, XOR circuits, XNOR circuits, etc., for performing various latch-based operations using the latches 208. Not all circuit or memory components that might be used in a practical NVM die are illustrated in the figure, such as voltage regulation components, clocks and timing components, etc. Rather only some components and circuits are shown, summarized as blocks.

Exemplary Binary Vector Processing Devices and Procedures

Figure 3:
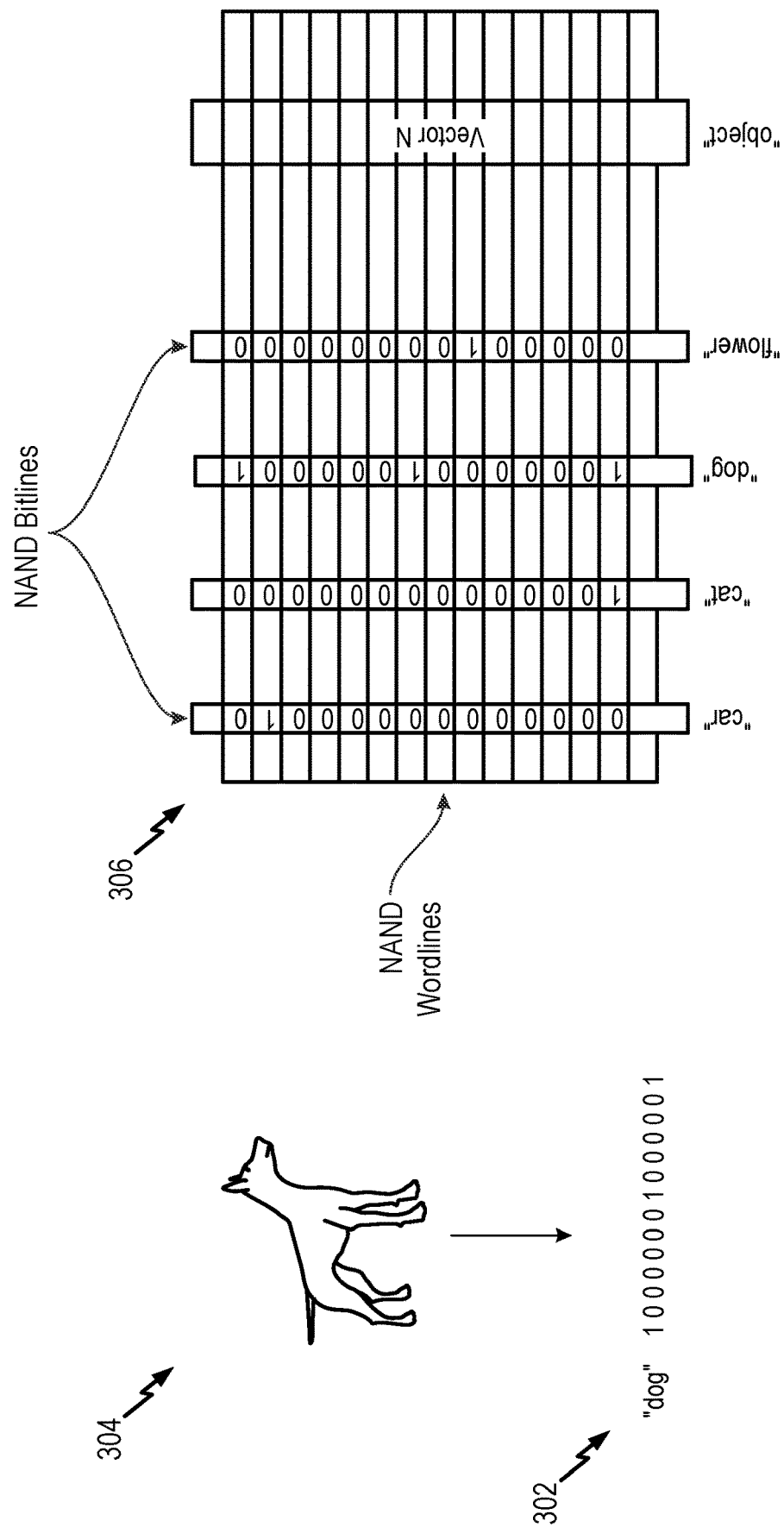
FIG. 3 illustrates an exemplary binary vector representation of an object stored within NAND bitlines, according to aspects of the present disclosure.

FIG. 3 provides an exemplary binary key vector representation 302 of an object that, in this example, is a dog 304. In the simplified example of FIG. 3, the dog is represented by only 14 bits. In a more practical example, the dog might be represented by far more bits. FIG. 3 also illustrates a portion of a NAND 306 that stores a database of binary vectors corresponding to various objects in NAND bitlines, such as binary vectors corresponding to a car, a cat, a dog, a flower, or, more generally, an object represented by a vector N, with each binary vector stored along a separate bitline of the NAND 306. As shown, each of the exemplary binary vectors in the NAND database differs in their particular sequence of bits. The binary vector 302 representing the dog may be used as a key vector to search the database. As explained above, the binary key vector need not be sent to the NVM die. Rather, the binary key vector may be maintained in the data storage controller, which sends suitable commands, signals, or instructions to the NVM die to perform a search to detect a match.

Figure 4:
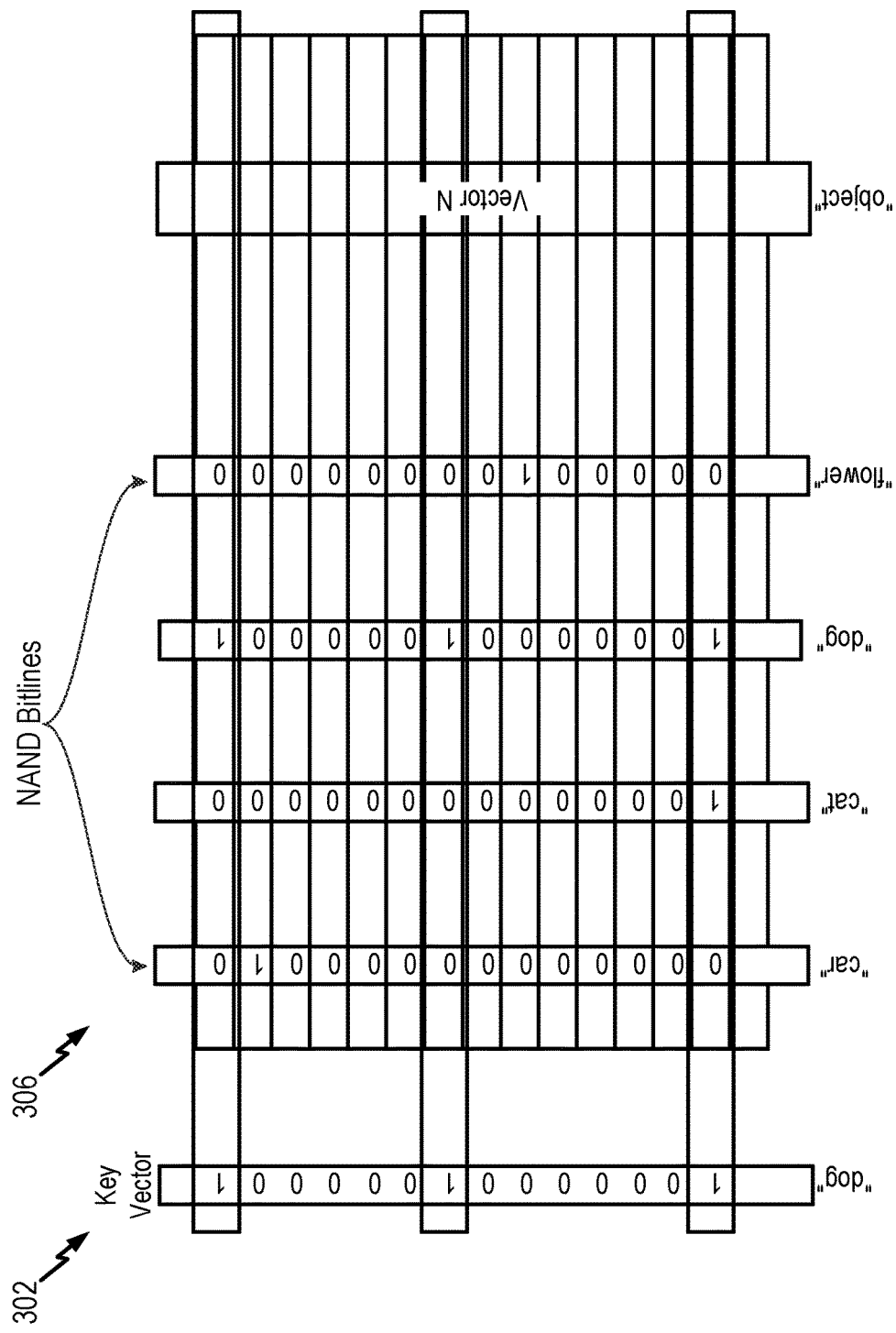
FIG. 4 illustrates that each '1' bit of the binary key vector may be compared against a corresponding bit of each of the binary vectors in the NAND bitlines, according to aspects of the present disclosure.

FIG. 4 illustrates that each '1' bit of the binary key vector 302 may be compared against a corresponding bit of each of the binary vectors in the NAND 306. That is, the binary key vector 302 may be compared to each bitline of the NAND 306. A count of matching '1' bits is maintained. In the example of FIG. 4, there are no matching '1' bits between the dog key vector and the stored car vector or the stored flower vector. There is one matching '1' bit between the dog key vector and the stored cat vector. There are three matching '1' bits between the dog key vector and the stored dog vector, indicating the closest match among these particular objects. In other examples, '0' bits in the key vector are compared against corresponding bits in the bitlines to detect matches. In still other examples, all bits of the key vector are compared against all corresponding bits in the bitlines, or a randomly selected subset of the bits of the key vector are compared with corresponding bits from the bitlines. Note that when using random selection, bit positions within the key vector are randomly selected (e.g., bit positions 2, 5, 6, 8, 11, etc.), and then the same bit positions within the stored binary vectors are sensed for comparison (e.g., corresponding bit positions 2, 5, 6, 8, 11, etc.). In some examples, the bits are selected based on the bit values of the key vector by, for example, selecting only a first portion of the bits if the first portion contains most of the '1's and ignoring a second portion that has mostly '0's.

In an illustrative example, given a search key "dog", for each vector dimension, the device senses corresponding bits in the NAND array and compares the bits to the key (using, e.g., the aforementioned sequence of commands) while conditionally accumulating a count of key-candidate matches across multiple vectors in parallel. The accumulated counts are an indication of the closeness of each vector to the key. Every wordline is sensed or, in other examples, a subset of wordlines is sampled. The compare operation may consist of (1) a NAND read sense to a data latch (e.g., a latch 208 of FIG. 2) and (2) a command to compare the latch to 0 or 1 and increment a counter. In some examples, when the search operation completes, the data storage controller or the host reads out the most significant bit (MSB) of the counter or, in other examples, all the bits of the counter. Note that this procedure can tolerate some bit errors in the NAND array because multiple bits are tested for evidence of a match and so the match need not be perfect. Thresholds may be set to specify the amount of similarity needed between a pair of vectors to indicate a match. Since bit errors are tolerated, error correction coding (ECC) is generally not needed, even when using MLC.

For an example where the NVM die is a 1 terabyte (Tb) die with 4 planes×16 kilobyte (KB)×8 bits/byte (for a total of 512K bitlines), one dimension of the 512K vectors can be compared in a single wordline read. If the search operation requires 100 comparisons and a NAND sense takes 25 μs (with 15 us of other overhead), a single die is capable of performing about 250 key searches per second or about 131M (mega) vector comparisons per second per die. A 16 TB drive with 128 dies thus can perform about 16.8 G (giga)

vector comparisons per second per drive at roughly 15-20 watts (W). A 1.0 Tbit tri-level cell (TLC) die operated in SLC mode has a capacity of about 333.3 Gbit. Assuming vectors of dimension 2048.0 bit/vector, an SLC die can store about 162.8 MVectors per die. A drive with 128 dies can store about 20.8 GVectors per drive. These are example performance numbers, and performance in each implementation will depend on the types of dies used, with their respective storage densities and performance characteristics.

Figure 5A:
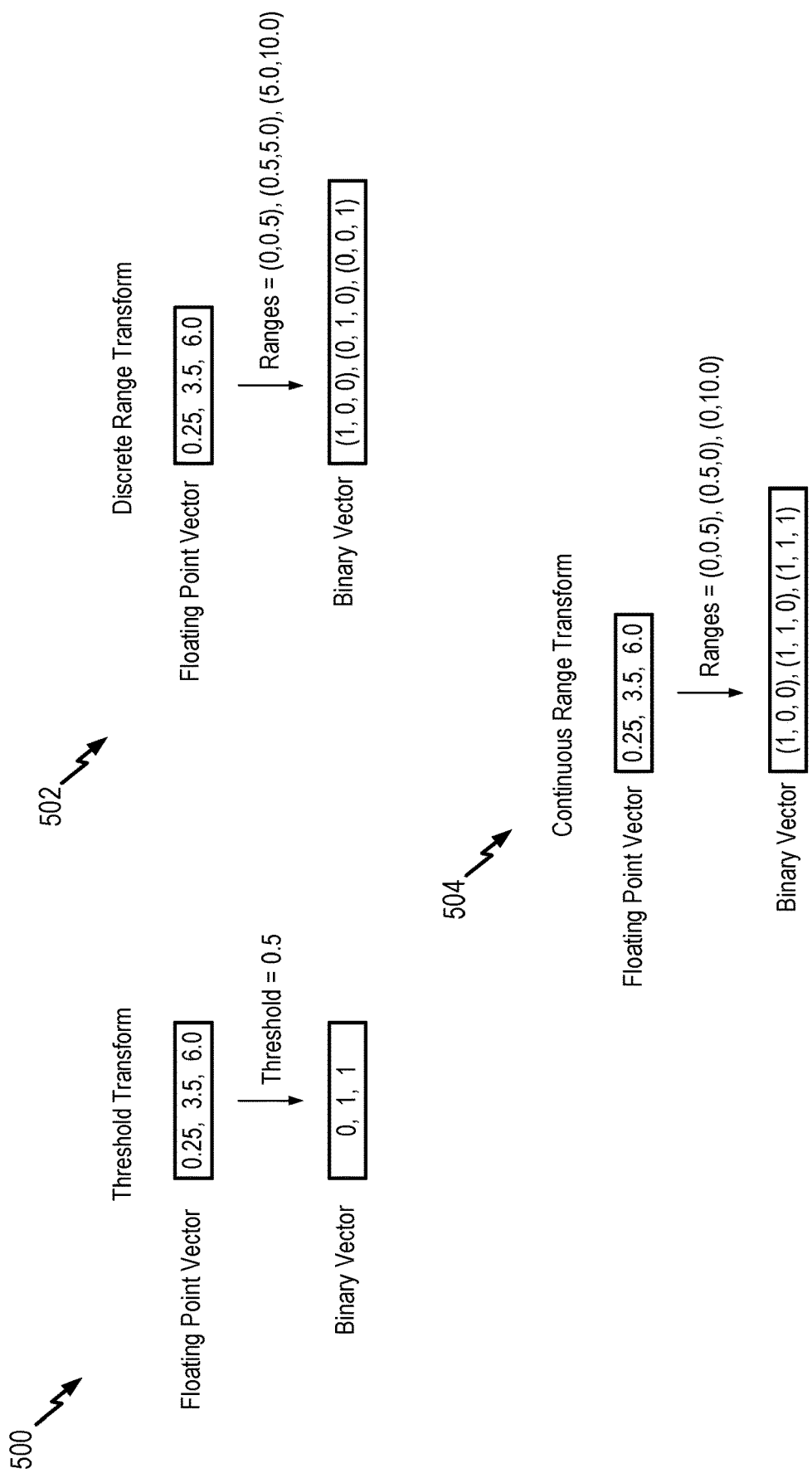
FIG. 5A illustrates various floating-point vector to binary vector conversion procedures that convert or transform a floating-point vector into a binary vector, according to aspects of the present disclosure.

FIG. 5A illustrates various floating-point vector to binary vector conversion schemes or procedures that convert or transform a floating-point vector into a binary vector. As noted above, the conversion from floating-point vector to binary vector may be performed by components of a data storage controller or, in some cases, by a host or other system. In a threshold transform 500, each floating-point dimension is converted to a single binary dimension (1-bit). For example, each value within the floating-point vector is compared against a threshold, such as 0.5, and if it is below the threshold, a '0' is assigned in the corresponding binary vector, otherwise a '1' is assigned. In a discrete range transform 502, each floating-point dimension is converted to multiple bits based on discrete ranges. Only one bit is set per dimension. For example, multiple ranges may be defined such as 0 to 0.5, 0.5 to 5.0, and 5.0 to 10.0. Each value in the floating-point vector is compared to each of these ranges and, if it is within the range, a '1' is assigned, otherwise a '0' is assigned. Accordingly, with three ranges, three bits within the binary vector are used to represent each floating-point value. Note that the ranges need not be of equal width. In some aspects, the discrete range of transform operates to: compare a non-binary value within a floating-point vector to a plurality of thresholds; assign a binary one to a first bit of a binary sequence (initially set to all zeros) if the floating-point value is less than a first threshold of the plurality of thresholds; assign a binary one to a second bit of the binary sequence if the floating-point value is greater than (exceeds) the first threshold but less than a second threshold of the plurality of thresholds; and assign a binary one to a third bit of the binary sequence if the floating-point value is greater than the second threshold.

In a continuous range transform 504, each floating-point dimension is converted to multiple bits based on continuous ranges. Multiple bits are set per dimension, one per range that is less than or contains the floating-point value. For example, multiple ranges are defined with each range extending from 0 to a threshold amount, such as 0 to 0.5, 0 to 5.0, and 0 to 10.0. Hence, the ranges are not discrete but are overlapping. Each floating-point value is compared to each of the ranges and binary '1's are stored in the binary vector for each range that the floating-point value is within. Hence, some floating-point values will be represented by multiple '1's. In some aspects, the continuous range of transform operates to: compare a non-binary value within a floating-point vector to a plurality of thresholds; assign a binary one to a first bit of the binary sequence (initially set to all zeros) if the floating-point value is less than a first threshold of the plurality of thresholds; assign a binary one to a second bit of the binary sequence if the floating-point value is less than a second threshold of the plurality of thresholds; and assign a binary one to a third bit of the binary sequence if the floating-point value is greater than the second threshold. Note that the number of ranges and the threshold values within the ranges shown in FIG. 5 are merely exemplary. More or fewer ranges may be employed using programmable threshold values.

Figure 5B:
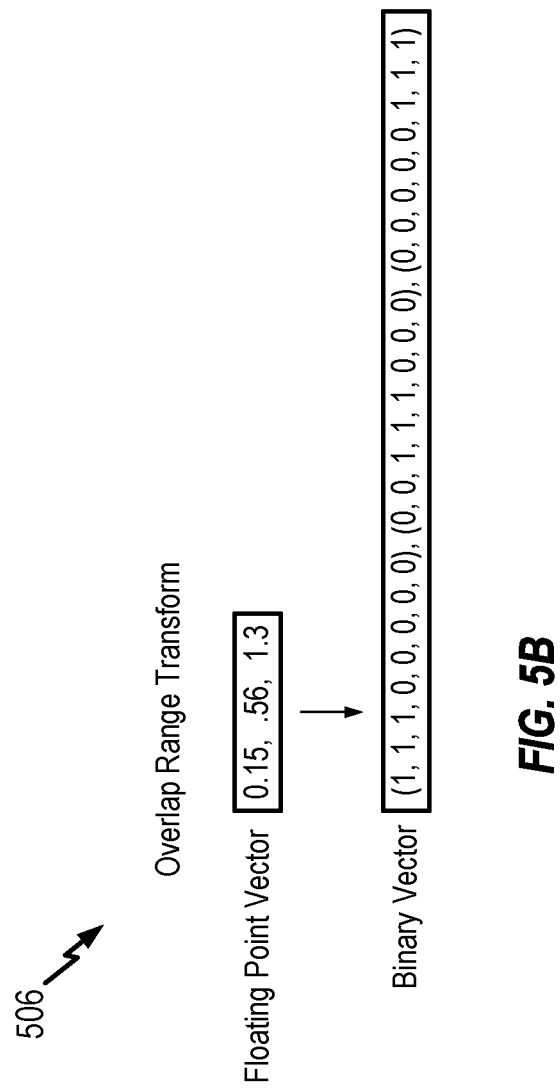
FIG. 5B illustrates an overlap range transformation that converts or transforms a floating-point vector into a binary vector, according to aspects of the present disclosure.

FIG. 5B illustrates an overlap range transform, scheme or procedure that converts a floating-point vector into a binary vector. In an example of an overlap range of transform 506, a sub-vector pattern is computed for each entry in the source vector. A range, e.g., [0, 1.50], is broken into six sub-intervals. The "overlap" value determines how many bits are set in a bitmask. The bitmask is shifted based on which interval the source vector value is in. The sub-vectors are concatenated together to create a final binary vector stored in the memory. A "nearness" score of two values is computed by: a) taking the logical "AND" of the binary vectors; and b) counting the number of 1's in the result, e.g., by using a POPCOUNT operation, where POPCOUNT refers to a population count, sideways sum, bit summation, or binary version of a Hamming weight. The closer the ranges, the more the bits overlap, leading to a higher "nearness" score.

TABLE 1 shows the mapping of ranges to sub-vector bitmaps while using three different "overlap" values.

TABLE I

| Intervals | Binary Sub-Vector Pattern | | |
|---|---|---|---|
| | (Overlap = 1) | (Overlap = 2) | (Overlap = 3) |
| [0.00, 0.25) | (1, 0, 0, 0, 0, 0) | (1, 1, 0, 0, 0, 0) | (1, 1, 1, 0, 0, 0, 0, 0) |
| [0.25, 0.50) | (0, 1, 0, 0, 0, 0) | (0, 1, 1, 0, 0, 0) | (0, 1, 1, 1, 0, 0, 0, 0) |
| [0.50, 0.75) | (0, 0, 1, 0, 0, 0) | (0, 0, 1, 1, 0, 0) | (0, 0, 1, 1, 1, 0, 0, 0) |
| [0.75, 1.00) | (0, 0, 0, 1, 0, 0) | (0, 0, 0, 1, 1, 0, 0) | (0, 0, 0, 1, 1, 1, 0, 0) |
| [1.00, 1.25) | (0, 0, 0, 0, 1, 0) | (0, 0, 0, 0, 1, 1, 0) | (0, 0, 0, 0, 1, 1, 1, 0) |
| [1.25, 1.50) | (0, 0, 0, 0, 0, 1) | (0, 0, 0, 0, 0, 1, 1) | (0, 0, 0, 0, 0, 1, 1, 1) |

TABLE 2 is an example of computing a distance score of two values x=0.1 and y=0.4 by using POPCOUNT.

TABLE II

| Var | Val | Interval | Bitmap |
|---|---|---|---|
| x | 0.1 | [0.00, 0.25) | (1, 1, 1, 0, 0, 0, 0, 0) |
| y | 0.4 | [0.25, 0.50) | (0, 1, 1, 1, 0, 0, 0, 0) |
| x and y | | | (0, 1, 1, 0, 0, 0, 0, 0) |
| POPCOUNT(x and y) | | | 2 |

Figure 6:
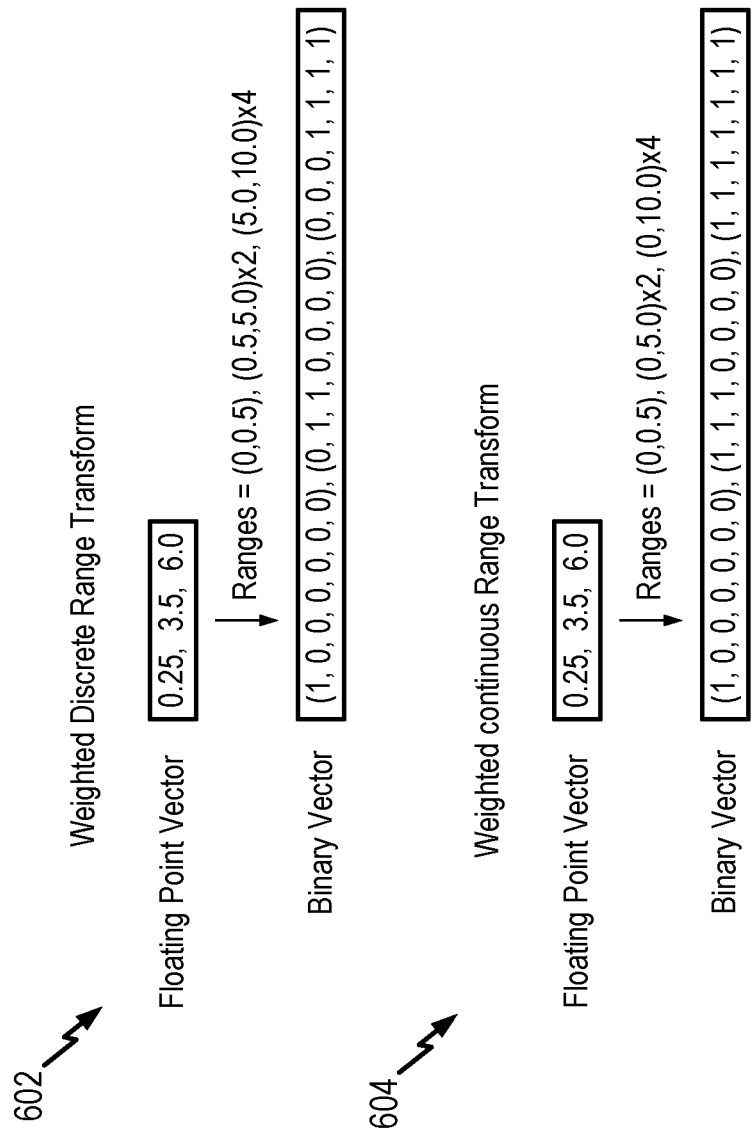
FIG. 6 illustrates various weighted conversion procedures that convert or transform a floating-point vector into a binary vector, according to aspects of the present disclosure.

FIG. 6 illustrates various weighted floating-point vector to binary vector conversion schemes or procedures that convert or transform a floating-point vector into a binary vector. In a weighted discrete range transform 602, each floating-point dimension is converted to multiple bits based on discrete ranges. The number of bits set may be proportional to the magnitude of the range that contains the floating-point value. For example, multiple ranges may be defined such as 0 to 0.5, 0.5 to 5.0, and 5.0 to 10.0 but the middle range is counted (weighted) twice and the top range is counted (weighted) four times. Each value in the floating-point vector is compared to each of these ranges. If the floating-point value is within the lowest range, a first sequence of bits is assigned that counts the value only once, i.e., the sequence 1,0,0,0,0,0,0. If the floating-point value is within the middle range, a second sequence of bits is assigned that counts the floating-point value twice, i.e., the sequence 0,1,1,0,0,0,0. If the floating-point value is within the top range, a third sequence of bits is assigned that counts the floating-point value four times, i.e., the sequence 0,0,0,1,1,1,1. Thus, larger floating-point values are weighted in the binary vector by representing them using significantly larger binary numbers.

In a weighted discrete range transform 604, each floating-point dimension is converted to multiple bits based on continuous ranges. Bits are set for each range that is less than or contains the floating-point value. The number of bits set per range may be proportional to the magnitude of the range. For example, multiple overlapping ranges may be defined such as 0 to 0.5, 0 to 5.0, and 0 to 10.0, with the middle range counted (weighted) twice and the top range counted (weighted) four times. Each value in the floating-point vector is compared to each of these ranges. If the floating-point value is within only the lowest range, a first sequence of bits is assigned that counts the value only once, i.e., the sequence 1,0,0,0,0,0,0. If the floating-point value is within the lower and the middle range, a second sequence of bits is assigned that counts the floating-point value twice, i.e., the sequence 1,1,1,0,0,0,0. If the floating-point value is within all three ranges, a third sequence of bits is assigned that counts the floating-point value four times, i.e., the sequence 1,1,1,1,1,1,1. Thus, larger floating-point values are weighted in the binary vector by representing them using significantly larger binary numbers, with the values in the scheme of 604 even larger than the values in the discrete weighted case of 602. Note that the number of ranges and the threshold values within the ranges shown in FIG. 6 are merely exemplary. More or fewer ranges may be employed using programmable threshold values. Also, the amount of weighting to the ranges may be different than in FIG. 6 with, for example, the top range weighted three times rather than four times.

Although described primarily with respect to devices that convert floating-point vectors to binary vectors, similar or alternative procedures may be employed to convert other non-binary input vectors into binary vectors, such as by converting fixed-point vectors to binary vectors. Still further, the object-oriented data received by the NVM die might not be in a vector format but in some other format such as a scalar database format, which the NVM die circuitry then converts to a binary vector format for storage in the NAND bitlines. Still further, note that the various conversion procedures may be implemented, in some aspects, using volatile memory such as DRAM. For example, the overlap range conversion may be implemented using DRAM while employing a vertical orientation to the vectors. This may be done even if any needed counting is not done on the DRAM die.

Figure 7:
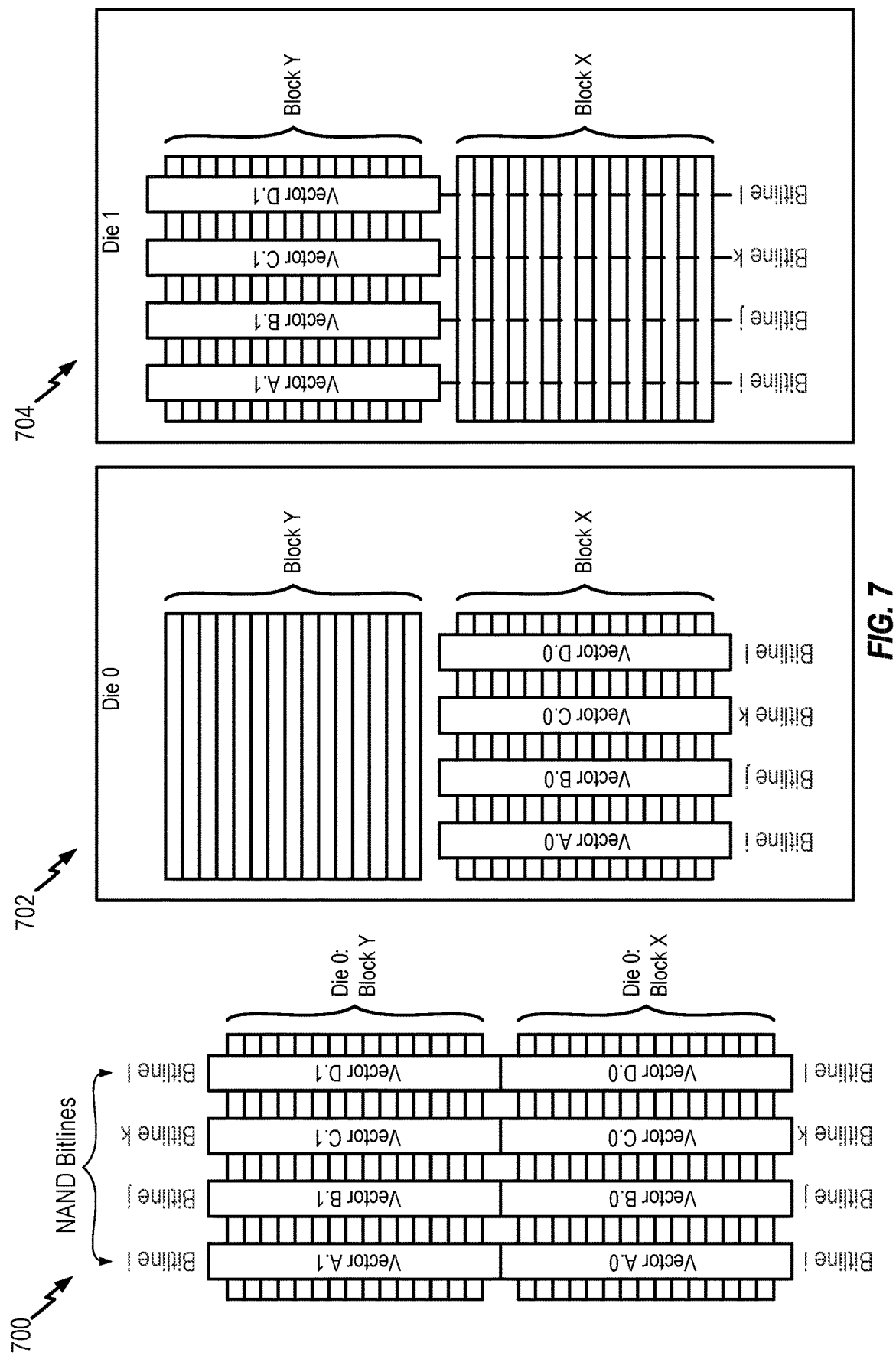
FIG. 7 illustrates various distributions of binary vectors within the NAND bitlines and across blocks and dies, according to aspects of the present disclosure.

FIG. 7 illustrates various distributions of binary vectors within the NAND bitlines. In a first example, binary vectors span two blocks in the same die (die 0) 700. Since each vector is contained in a single die, the conditional counts may be done entirely "on die". In this example, the single die has a Block X and a Block Y. Bitlines i, j, k, and l are shown with bitline i of Block X storing a first portion of vector A (vector A.0), bitline j of Block X storing a first portion vector B (vector B.0), bitline k of Block X storing a first portion vector (vector C.0), and bitline l of Block X storing a first portion vector D (vector D.0). Bitlines i, j, k, and l also extend through Block Y, with bitline i of Block Y storing a second portion of vector A (vector A.1), bitline j of Block Y storing a second portion vector B (vector B.1), bitline k of Block Y storing a second portion vector (vector C.1), and bitline l of Block Y storing a second portion vector D (vector D.1).

In a second example, vectors span two blocks in different dies: a first die (die 0) 702 and a second die (die 1) 704. In this example, the first die (die 0) has a Block X and a Block Y. Bitlines i, j, k, and l are shown with Block X of die 0, with bitline i of Block X of die 0 storing a first portion of vector A (vector A.0), bitline j of Block X of die 0 storing a first portion vector B (vector B.0), bitline k of Block X of die 0 storing a first portion vector (vector C.0), and bitline l of Block X of die 0 storing a first portion vector D (vector D.0).

The second die (die 1) 702 also has a Block X and a Block Y, with bitline i of Block Y of die 1 storing a second portion of vector A (vector A.1), bitline j of Block Y of die 1 storing a second portion vector B (vector B.1), bitline k of Block Y of die 1 storing a second portion vector (vector C.1), and bitline l of Block Y of die 1 storing a second portion vector D (vector D.1). Having vectors span two blocks in different dies can improve performance because parts of the vectors can be sensed and conditionally counted in parallel. Partial counts from each die may be transferred and accumulated in the controller. It may be preferable to have the same vector on the same bit-line in all blocks so counts can be accumulated more efficiently in memory or the controller.

Figure 8:
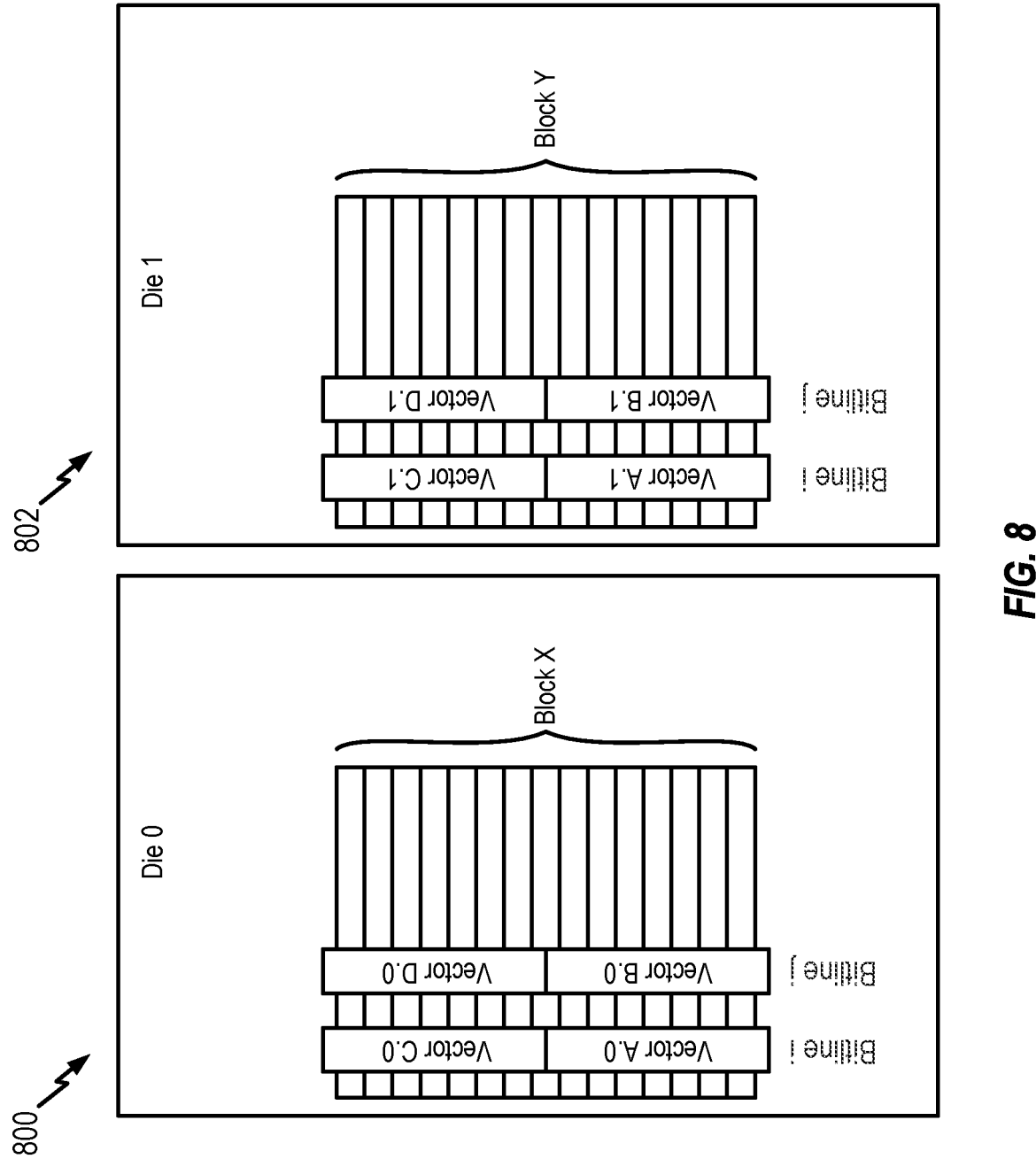
FIG. 8 illustrates that binary vectors need not occupy an entire bitline, according to aspects of the present disclosure.

FIG. 8 illustrates that the binary vectors need not occupy an entire bit-line, i.e., FIG. 8 shows partial vectors spanning two blocks in different dies to achieve sensing parallelism. As noted, it is preferable that the same vectors be placed on the same bit-line within a block. In the example of FIG. 8, a first die (die 0) 800 has a Block X. Bitlines i and j are shown, with a first portion of bitline i storing a first portion of vector A (vector A.0) and a second portion of bitline i storing a first portion of vector C (vector C.0). A first portion of bitline j stores a first portion of vector B (vector B.0) and a second portion of bitline j stores a first portion of vector D (vector D.0). A second die (die 1) 802 has a Block Y. Bitlines i and j are again shown, with a first portion of bitline i storing the second portion of vector A (vector A.1) and the second portion of bitline i storing the second portion of vector C (vector C.1). A first portion of bitline j stores the second portion of vector B (vector B.1) and a second portion of bitline j stores the second portion of vector D (vector D.1).

Thus, vectors may span multiple blocks or fractions of blocks. They need not be aligned to the start of a bit-line. Vectors preferably occupy the same plane and bit-line so that matching bits can be accumulated in the same counter. If a vector spans multiple blocks, as in FIGS. 7 and 8, the main impact on performance is on the write amplification if or when invalid vectors need to be reclaimed, similar to garbage collection in storage blocks.

As noted above, Euclidean distance may be used to assess the similarity of two binary vectors. That is, a vector database may use Euclidean distance to determine how close two vectors are to each other. This may be computed as:

$$\sqrt{\sum_{i=1}^{n}(p_i - q_i)^2} \qquad \text{Eq. 1}$$

where p and q are vectors with dimension n, and $p_i$ and $q_i$ are the ith bit of each vector. For binary vectors, an XOR may be used to calculate the distance between two vectors in every dimension. The distance between the two vectors is then the square root of the number of dimensions where the vectors are not equal:

$$\sqrt{\sum_{i=1}^{n}(p_i \oplus q_i)} \qquad \text{Eq. 2}$$

Which can also be expressed as:

$$\sqrt{n - \sum_{i=1}^{n}\overline{(p_i \oplus q_i)}} \qquad \text{Eq. 3}$$

or $$\sqrt{n - \sum_{i=1}^{n}(p_i \odot q_i)} \quad \text{Eq. 4}$$

Equation 4 is amenable to searching in a NAND. The closeness of two vectors is proportional to the number of bit positions where the two vectors match. (Note that $\odot$ is the XNOR operator and $\oplus$ is the XOR operator.) In the following, various examples are provided that exploit Equation 4 to assess similarity using Euclidean distance. However, as noted, other similarity measures may also be used such as cosine similarity or Jaccard Similarity.

Turning now to the comparing of a binary key vector to stored binary vectors and the counting of matching bits (which may be performed by components on the NVM die), a 3-bit adder (or half adder or incrementor) may be implemented within a die (such as die 200 of FIG. 2) that has a set of five or six latches, e.g., latches X, A, B, C, T, S. When the counter (e.g., counter 219) saturates, the NVM die can notify the controller (e.g., controller 108) using a cache ready signal (or another suitable signal). The controller can then read registers of the die, accumulate counts in controller memory (e.g., memory 110), reset the NAND data latches (e.g., latches 208), and continue further comparison. In an illustrative example, a 3-bit counter plus 1 overflow bit per bitline may be provided on a die, such as dies with SLC, TLC or quad-level cell (QLC) memory. M wordlines can be read and accumulated. If M>7, some counters might saturate (i.e., overflow). Firmware may be configured to set a threshold N corresponding to the number of counters that need to overflow before the NAND notifies the controller, which may be achieved by asserting a status line (i.e., toggling the status line to ON instead of OFF). Overflow locations can be programmed to an unused wordline or read out to the controller. Note that using multiple counters and only notifying the controller once some threshold number of counters overflows (saturates) can reduce how often the controller is notified.

In some examples, to search a binary key vector in the NVM array, if 1's are sparse in the NVM array, the device: identifies the location of 1's in the binary key vector; resets the latches used for counter; and senses the WL of each 1 location. After each sensing, a counter increment sequence is performed. In the end, the device can stream out the overflow bit page. The location of the 1's represent the likely match locations.

Figure 9:
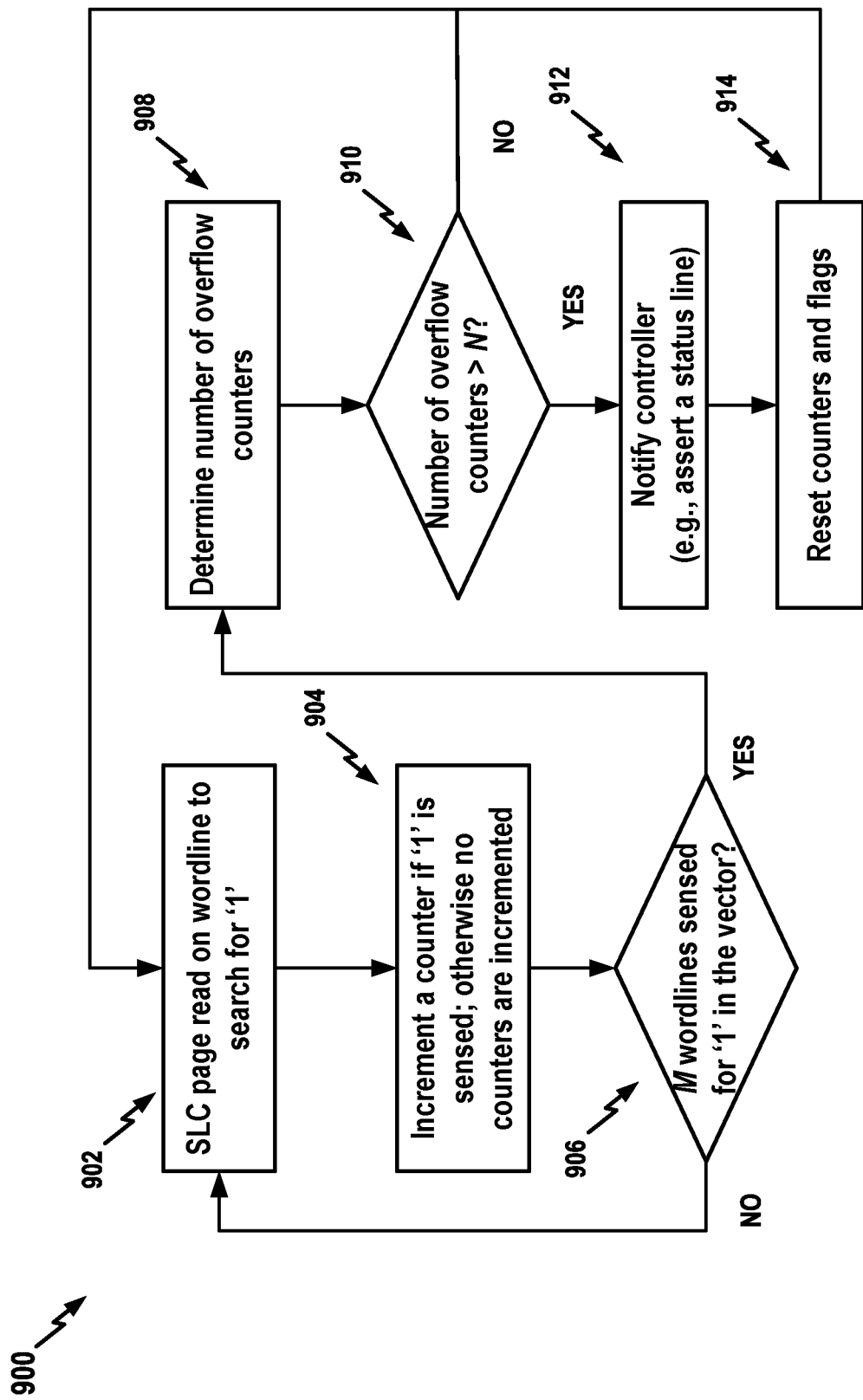
FIG. 9 is a flow chart of an exemplary method according to aspects of the present disclosure for an on-die comparison of a binary key vector to a stored binary vector while counting matching bits.

FIG. 9 provides an exemplary procedure 900 for an on-die comparison of a binary vector to a stored vector in SLC while counting matching bits. In this example, M wordlines are sensed to determine if the wordline has a '1' that matches a '1' in a corresponding bit location of a binary key vector being searched. Beginning at block 902, an SLC page is read on a wordline of the die to search for a '1' since, in this example, the bit of the key vector being matched is a 1. In other words, a '1' is expected if there is a match, and a '0' is expected otherwise. At block 904, a counter is incremented if the bit that was sensed was indeed a 1. Otherwise, no counters are incremented. At block 906, the firmware determines whether at least M wordlines have been sensed to search for the 1. If not, processing returns to block 902 for more SLC page reads. Otherwise, processing continues to block 908 and the firmware detects the number (if any) of overflow counters. This value is compared at block 910 against the threshold N. If the number of overflow counters does not exceed N, processing again returns to block 902. Once the number of overflow counters exceeds N, indicating a match, processing proceeds to block 912. At block 912, the controller is notified (e.g., the die asserts its status line as an interrupt or generates a suitable indicator) so that logic in the controller can respond to the match, such as by notifying the host. Also, at block 912, the die firmware can save an indication of the current overflow location(s), i.e., information pertaining to the counters that overflowed, or send that information to the controller. At block 914, the firmware resets the counter(s) and any corresponding flags. Processing again returns to block 902 to proceed to the next SLC page read. Note that, instead of searching for matching '1's, the device could search for matching '0's. Note that with this procedure the key vector is not stored on the NVM die. Instead, the data storage controller stores the key vector and checks bits in the key vector 1-by-1 by causing the NVM die to read a wordline from its NAND blocks, then perform a test-and-conditional-increment operation where the test for '1' or '0' depends on the value in the key vector.

Figure 10:
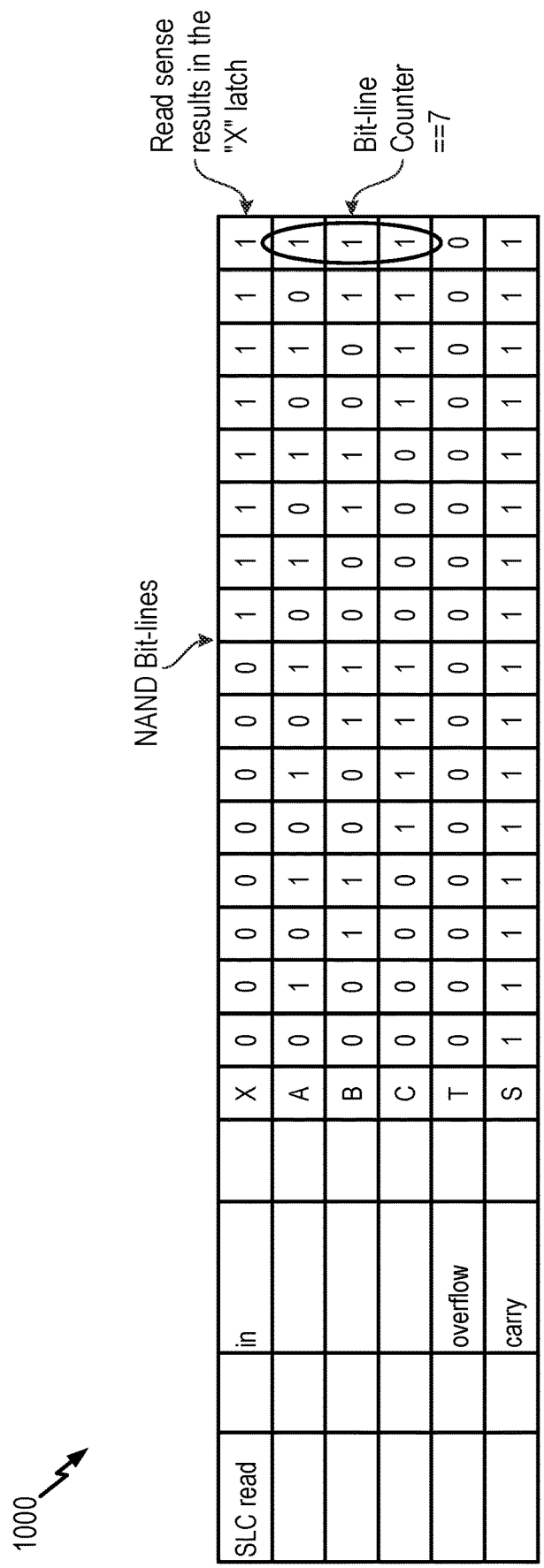
FIG. 10 illustrates a table of NAND commands and exemplary latch values for an on-die comparison of a binary vector to a stored vector while counting matching bits, according to aspects of the present disclosure.
Figure 11A:
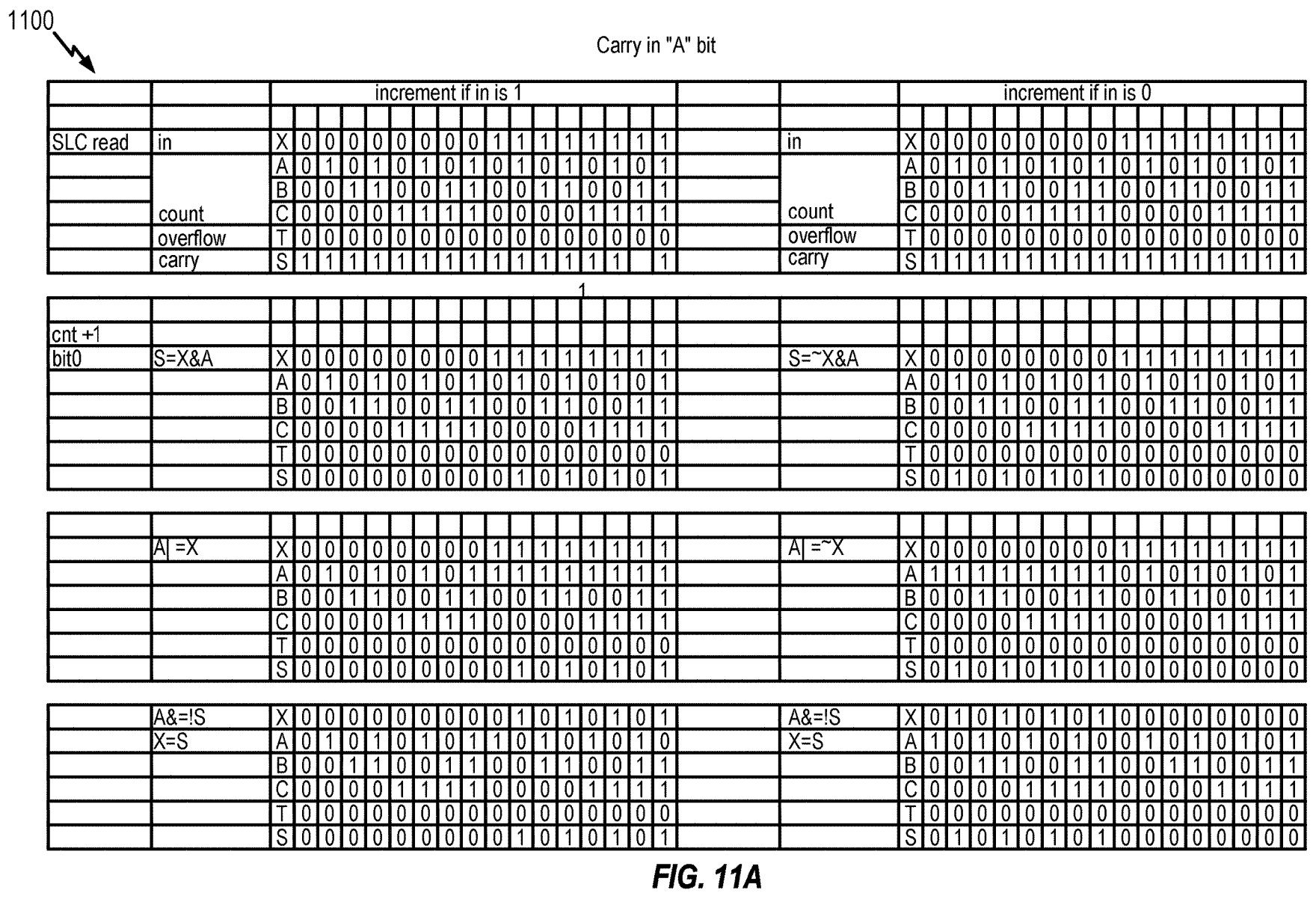
Figure 11B:
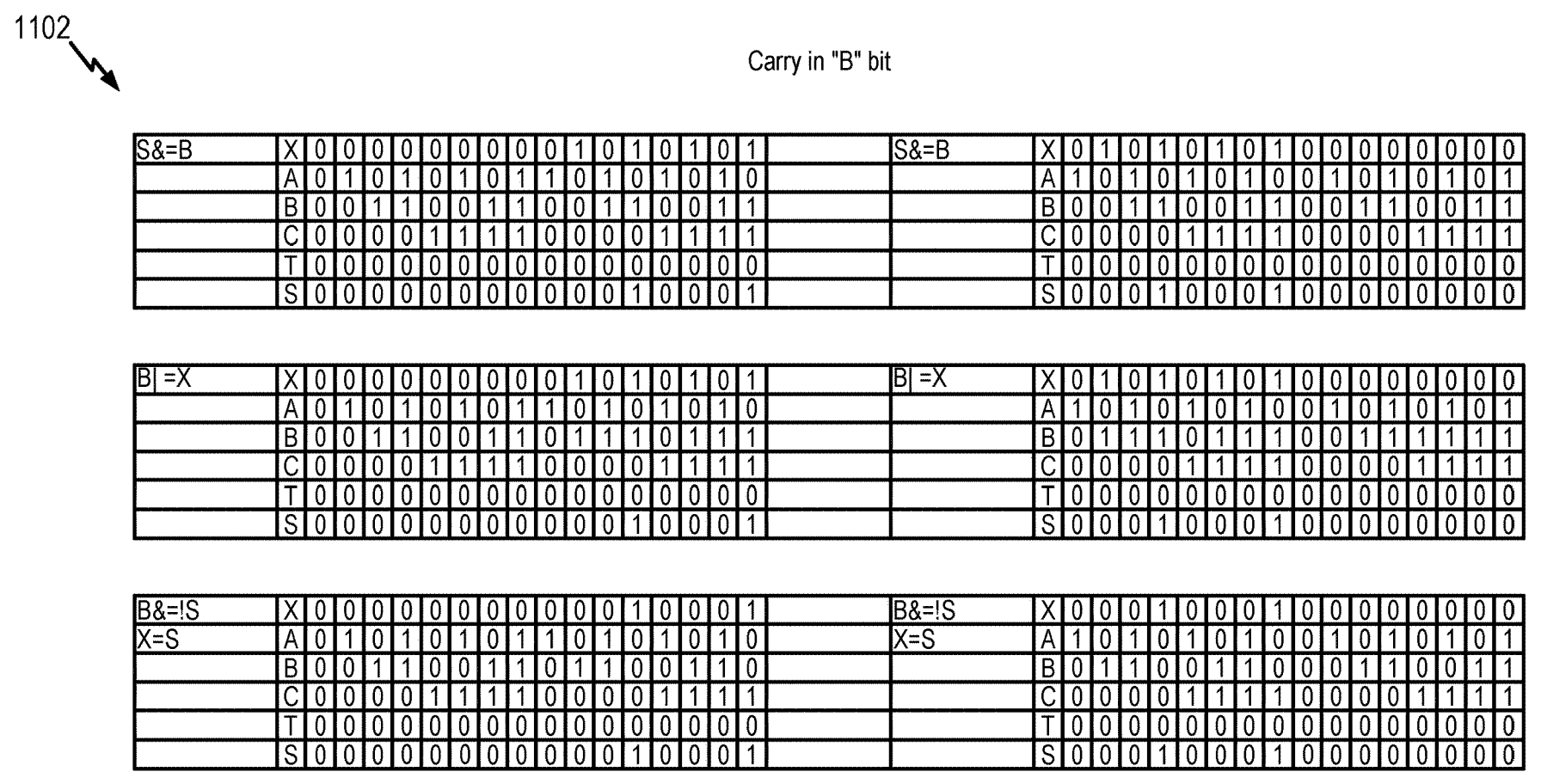

As explained above, the data storage controller may generate a sequence of signals or commands for sending to the NVM die (e.g., along a test line) to cause the die to determine whether a bit within a binary key vector matches a corresponding bit within a binary vector stored in the NVM array and accumulate the results in the on-die latches (which, as noted, may be components of sense amps). FIGS. 10, 11A and 11B provide examples.

FIG. 10 illustrates a table 1000 of exemplary latch values for an on-die compare of a binary vector to a stored vector in SLC while counting matching bits. (The die itself may be configured for MLC, e.g., QLC, but in this example, the data is stored in SLC.) The example illustrates aspects of the implementation of a 3-bit per bit-line counters (or half adder or incrementor) in NAND latches for a SLC die with 6 latches: X, A, B, C, T, S. The sequence, which begins with an SLC read, conditionally counts bits that match '1's or '0's in the X latch. The table 1000 shows the progression of the state of the latches across 16-bitlines. Each bit-line shows one of the eight possible counter states times two possible carry-in states. The X latch is "carry in" (i.e., the wordline read sense results are deposited in the X latch). The last bits in the A, B, C latches contain the 3-bit bit-line counter state. In this particular example, the bits are 1, 1, 1, thus indicating a counter value of 7. Note that the three bits of the counter may be regarded as the "A" bit, the "B" bit, and the "C" bit of the counter. The T latch contains "overflow." The S latch contains the "carry out bit." On some dies, the compare and counter increment operation of FIG. 10 is expected to take about 35-40 microseconds (µs). Note that with more latches, more time is available before the counters saturate.

Figure 11C:
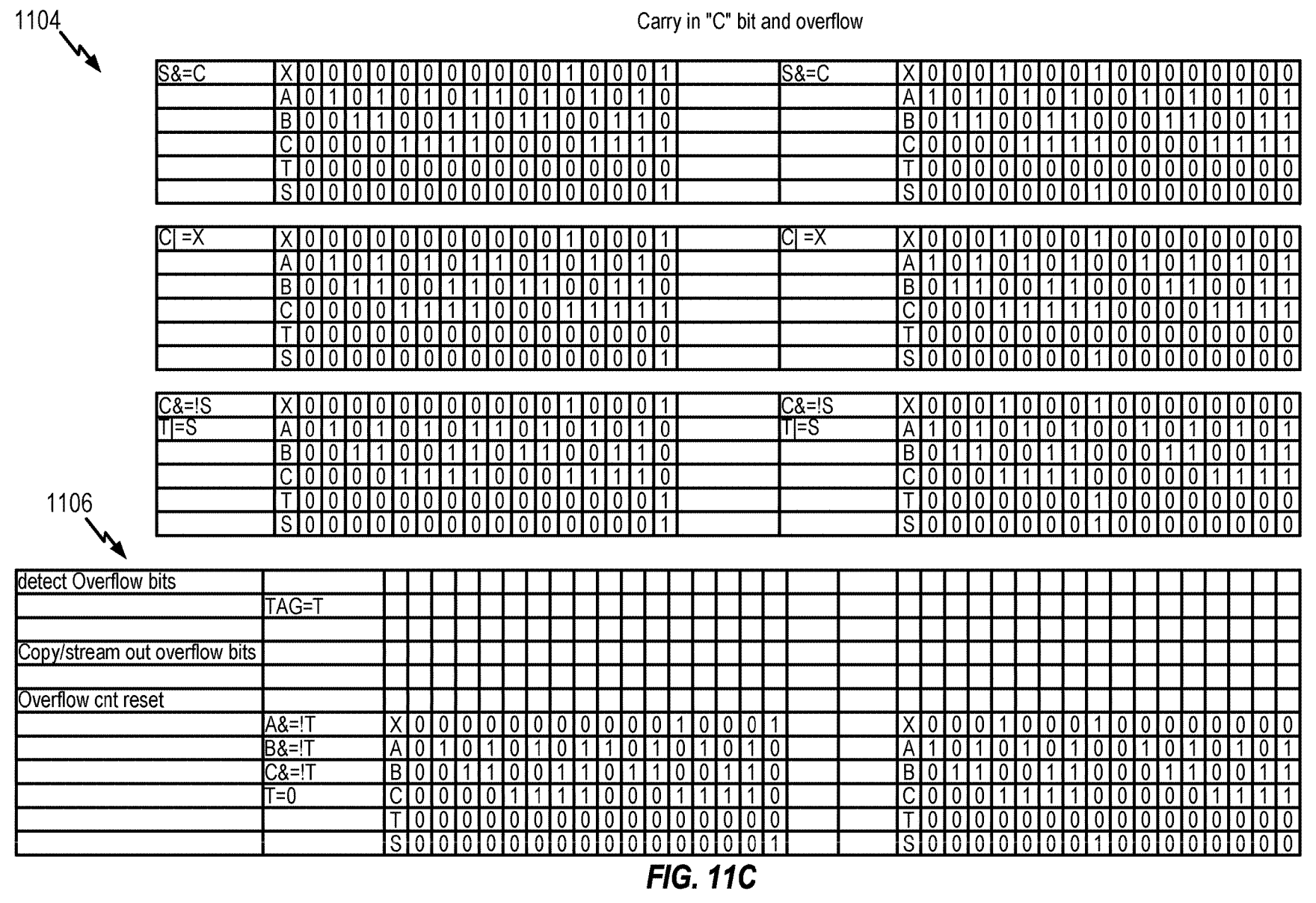

FIGS. 11A-11C illustrate tables 1100, 1102, 1104, and 1106 providing further details for an exemplary on-die comparison of a binary vector to a stored vector in SLC while counting matching bits. Among other features, the tables list the logic operations being performed, such as various bitwise ANDs (&=) and bitwise inclusive ORs (|=), etc., as well as not operands (!=) to check if the values of two operands are equal. As these are standard logic operators, they will not be further described. Table 1100 shows first sequence of logic operations (beginning with the SLC read) performed to carry in the "A" bit. Table 1102 shows a second sequence of logic operations performed to carry the "B" bit. Table 1104 shows a third sequence of logic operations performed to carry the "C" bit and overflow. Table 1106 shows that overflow bits are detected and overflow counters are reset. The controller firmware can specify how many "T" bits must be set before the NAND asserts status (i.e., notifies the controller of a match). The controller can then read out "T" bits and reset only the counters that overflowed or reset all counters. In the example of FIGS. 11A-11C, the last bit in T is '1' upon completion of the "carry to C" logic operations. This value is reset to '0' in the end. Note that in FIGS. 11A and 11B some of the individual bits in the tables are highlighted to show the manipulation of certain bit values through the latches during the procedure.

The sequence of operations of FIGS. 11A-11C may instead by represented by a single instruction that causes the NVM die to perform the sequence of operations to search for the key bit in the NVM. For example, a XNOR1 or XNOR0 instruction may be provided, wherein XNOR1 is sent to the NVM die if the corresponding bit in the key vector is 1 and the XNOR0 instruction is sent to the NVM die if the corresponding bit in the key vector is 0. Again, the key bit itself need not be explicitly sent to the NVM die. Instead, an instruction is sent that applies an implicit 1 or 0, with XNOR1 providing the implicit 1 and XNOR0 providing the implicit 0.

Note that in examples where there are six data latches per bitline on the NVM die, the latches and sensing circuits enable flash memory to perform a four bit per cell program/read. The latches store the counter results per vector/bitline. A test sequence performs the counter increment, which may be implemented by performing a page read of data in parallel. Although the use of a test sequence may be relatively slow, the overall system exploits parallelism to achieve satisfactory throughput while limiting power consumption.

Figure 12:
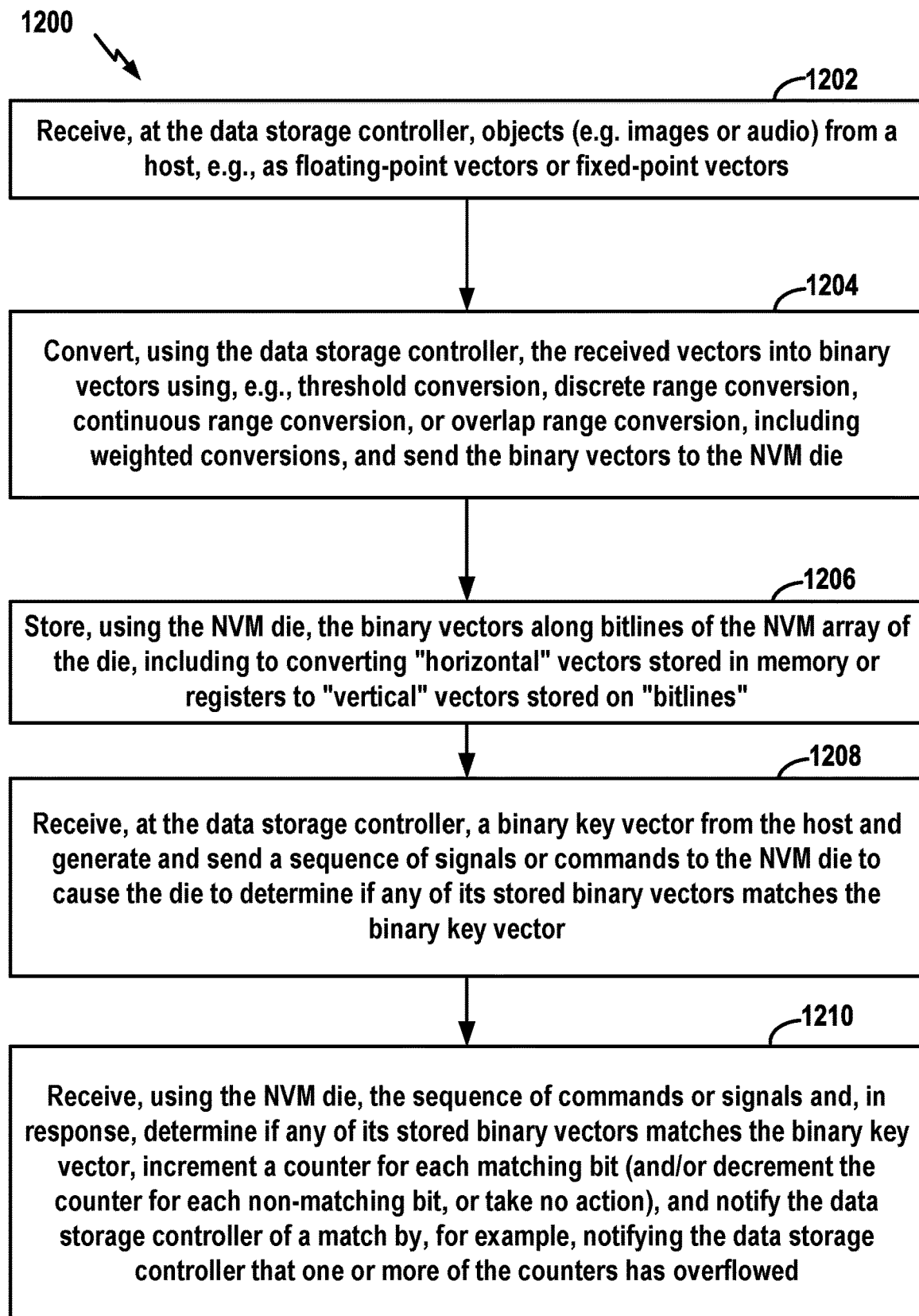
FIG. 12 is a flow chart summarizing an exemplary method according to aspects of the present disclosure for generating, storing, and searching binary vectors.

FIG. 12 is a flow diagram 1200 that summarizes some of the above-described features, some of which are performed by the data storage controller and some by the NVM die. At block 1202, the data storage controller receives objects (e.g. images or audio) from a host, e.g., as floating-point vectors or fixed-point vectors. At block 1204, the data storage controller converts the received vectors into binary vectors using, e.g., threshold conversion, discrete range conversion, continuous range conversion, or overlap range conversion, including weighted conversions, and sends the binary vectors to the NVM die. In other examples, as explained above, the host performs the conversion into binary vectors and sends the binary vectors to the data storage controller. Hence, in those examples, the data storage controller need not perform the conversion. In still other examples, the NVM die is configured with circuitry to perform the conversion, and so the data storage controller forwards the vectors from the host to the NVM die for conversion therein.

At block 1206, the NVM die stores the binary vectors along bitlines of the NVM array of the die, including converting "horizontal" vectors stored in memory or registers to "vertical" vectors stored on "bitlines," which may include striping the Nth dimension bit of every vector across the NAND wordlines. Note that the binary vectors may be held in a volatile memory before the vectors are programed/stored along the bitlines of NVM. In one example, since the vectors are stored in the bitline direction and NVM array programs wordline by wordline, 16 kB*8=128 k vectors are stored before programming into the NAND. Then, bit 0 of each vector programs to WL0, bit 1 program to WL1, and so on. At block 1208, the processing circuitry receives a binary key vector to be searched and loads the key vector into a latch of the die. Depending upon the nature of the binary vector database, the key vector may represent, for example, an image or text to search for within the database. At block 1208, the data storage controller also generates and sends a sequence of signals or commands to the NVM die to cause the die to determine if any of its stored binary vectors matches the binary key vector.

At block 1210, the NVM die receives the sequence of commands or signals and, in response, determines if any of its stored binary vectors matches the binary key vector, increments a counter for each matching bit (and/or decrements the counter for each non-matching bit, or, depending upon the implementation, takes no action in response to non-matching bits), and notifies the data storage controller of a match by, for example, notifying the data storage controller that one or more of the counters has overflowed. See, again, the sequence of commands of FIGS. 11A and 11B. The operations of block 1210 may be referred to as a compare and increment operation or a compare and decrement operation, depending upon the whether incrementing or decrementing is implemented. Alternatively, the operations of block 1210 may be referred to as a test-and-conditional-increment operation or a test-and-conditional-decrement operation, again depending upon whether incrementing or decrementing is implemented.

Insofar as the comparison of the binary key vector with the stored binary vectors is concerned, in some examples, the sequence of commands causes the NVM die to compare each bit of the key vector with each corresponding bit of a bitline (or to compare only a subset of corresponding bits, such as a set of randomly selected bits). In some examples, the bits to be compared are selected based on the bit values of the key vector by, e.g., selecting only a first portion of the bits if the first portion contains most of the '1's and ignoring a second portion that has mostly '0's.

Note that there are advantages in searching if the vectors in the database are sparse, e.g., there are far fewer '1's than '0's (for the case where '1's are counted) since, e.g., the counters overflow more slowly because there are far fewer matching bits. Insofar as matching probabilities are concerned, note that if the binary vectors have a sparse number of '1's and the probability of a bit being set is p, then the probability of a random vector matching the key in every tested bit position is pk, where k is the number of sense and compare operations. Thus, the risk of a random vector matching the key is minimal with large k. So, assuming vectors are sparsely populated, (e.g., Avg #bits set to "1"<5%), the counters for bit-line vectors with exact matches should increment rapidly. Counters for approximate matches should increment more slowly than exact matches, but faster than random matches. For example, after seven compare/increment operations, an exact match would have a "7." The odds of a random match being "7" (false positive) is thus $\sim 7 \times 10^{-10}$. Note also that, depending upon the system (e.g., neural network) that generates the initial floating-point vectors, it may be feasible to control or configure the system to generate sparse vectors as opposed to more compact vectors to facilitate fast and efficient NAND processing.

Also note that, although described with respect to examples where features are implemented using an NVM die, at least some aspects described herein may be exploited within volatile memory systems. For example, the binary vectors may be stored in DRAM, with counters and other processing circuitry also implemented on the DRAM.

Exemplary Apparatus Including Data Storage Controller and NVM Array

Figure 13:
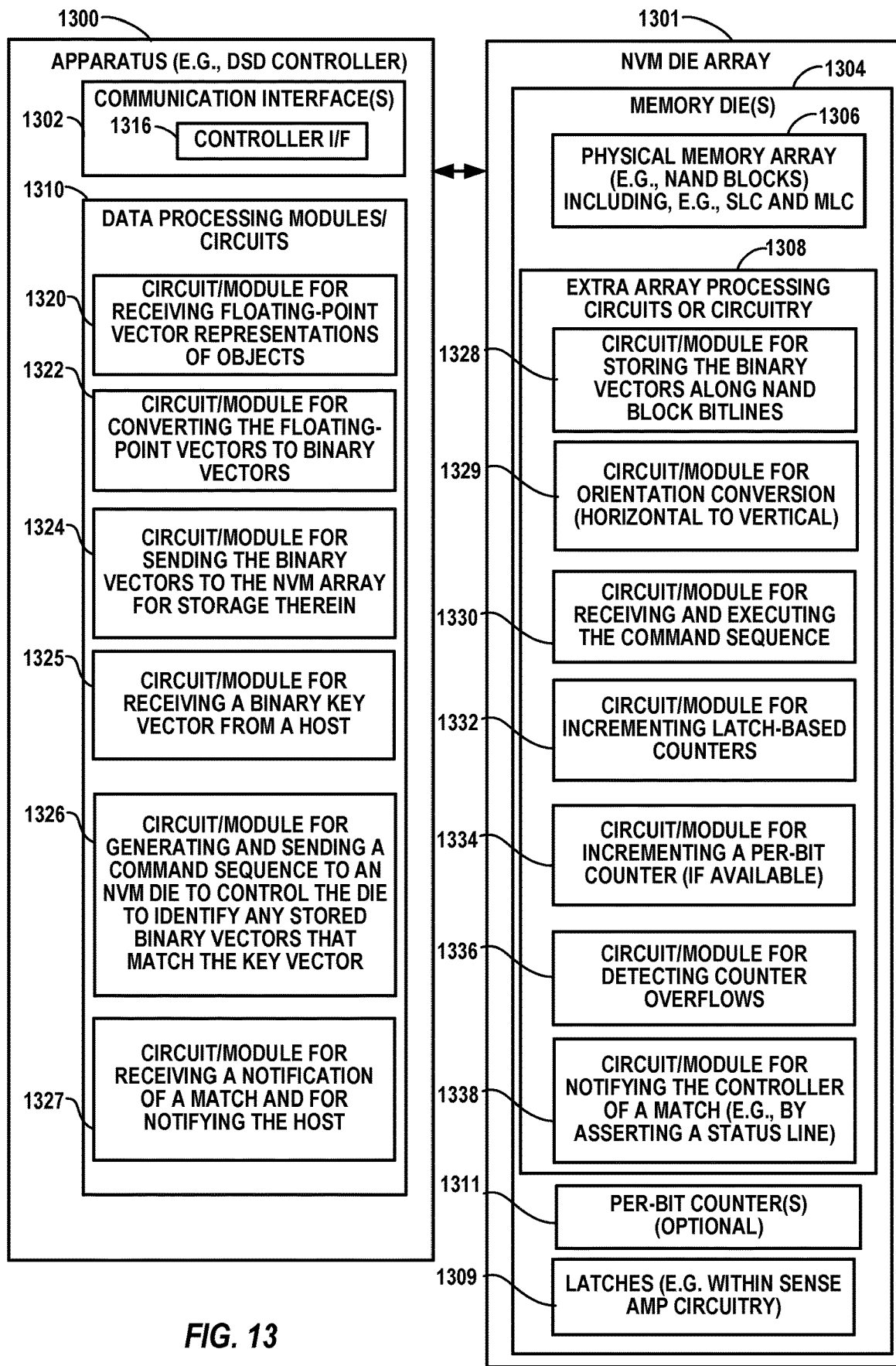
FIG. 13 is a schematic block diagram configuration for an exemplary apparatus such as a data storage device configured for generating and storing binary vectors, according to aspects of the present disclosure.

FIG. 13 illustrates an embodiment of an apparatus 1300 configured according to one or more aspects of the disclosure. The apparatus 1300, or components thereof, could embody or be implemented within a data storage device (DSD) other type of device that supports computations and data storage. In various implementations, the apparatus 1300, or components thereof, could be a component of a processor, a controller, a computing device, a personal computer, a portable device, or workstation, a server, a personal digital assistant, a digital camera, a digital phone, an entertainment device, a medical device, a self-driving vehicle control device, or any other electronic device that stores, processes, or uses data.

The apparatus 1300 is communicatively coupled to an NVM die array 1301 that includes one or more memory dies 1304, each of which may include physical memory arrays 1306, e.g., NAND blocks. In some examples, the memory dies may include on-chip computational circuitry such as under-the-array circuitry. The memory dies 1304 may be communicatively coupled to the apparatus 1300 such that the apparatus 1300 can read or sense information from, and write or program information to, the physical memory array 1306. That is, the physical memory array 1306 can be coupled to circuits of apparatus 1300 so that the physical memory array 1306 are accessible by the circuits of apparatus 1300. The memory die 1304 may also include extra-array processing circuitry 1308, latches 1309, and, in some embodiments, per-bit counters 1311. Note that the latches 1309 may be components of sense amp circuitry connected to each bit line of the NVM array 1306. In the figure, the latches are not shown. The dies may additionally include, e.g., input/output components, registers, voltage regulators, etc. The connection between the apparatus 1300 and the memory dies 1304 of the NVM die array 1301 may include, for example, one or more busses.

The apparatus 1300 includes a communication interface 1302 and fixed point data processing modules/circuits 1310, which may be components of a controller or processor of the apparatus. These components can be coupled to and/or placed in electrical communication with one another and with the NVM die array 1301 via suitable components, represented generally by connection lines in FIG. 13. Although not shown, other circuits such as timing sources, peripherals, voltage regulators, and power management circuits may be provided, which are well known in the art, and therefore, will not be described any further.

The communication interface 1302 provides a means for communicating with other apparatuses over a transmission medium. In some implementations, the communication interface 1302 includes circuitry and/or programming (e.g., a program) adapted to facilitate the communication of information bi-directionally with respect to one or more devices in a system. In some implementations, the communication interface 1302 may be configured for wire-based communication. For example, the communication interface 1302 could be a bus interface, a send/receive interface, or some other type of signal interface including circuitry for outputting and/or obtaining signals (e.g., signals to/from a host). The communication interface 1302 serves as one example of a means for receiving and/or a means for transmitting.

The modules/circuits 1310 are arranged or configured to obtain, process and/or send data, control data access and storage, issue or respond to commands, and control other desired operations. For example, the modules/circuits 1310 may be implemented as one or more processors, one or more controllers, and/or other structures configured to perform functions. According to one or more aspects of the disclosure, the modules/circuits 1310 may be adapted to perform any or all of the features, processes, functions, operations and/or routines described herein as being performed by data storage controller. For example, the modules/circuits 1310 may be configured to perform any of the data storage controller steps, functions, and/or processes described with respect to FIGS. 1, 5A, 5B, 6, and 12.

As used herein, the term "adapted" in relation to the processing modules/circuits 1310 may refer to the modules/circuits being one or more of configured, employed, implemented, and/or programmed to perform a particular process, function, operation and/or routine according to various features described herein. The modules/circuits may include a specialized processor, such as an application specific integrated circuit (ASIC) that serves as a means for (e.g., structure for) carrying out any one of the data storage controller operations described in conjunction with, e.g., FIGS. 1, 5A, 5B, 6, and 12. The modules/circuits serve as an example of a means for processing. In various implementations, the modules/circuits may provide and/or incorporate, at least in part, functionality described above for the components in various embodiments shown, including for example controller 116 of FIG. 1.

According to at least one example of the apparatus 1300, the processing modules/circuits 1310 may include one or more of: a circuit/module 1320 configured for receiving floating-point vector representations from a host of an object such as representations of images (or, in other examples, fixed-point vector representations); a circuit/module 1322 configured for converting the floating-point (or fixed-point) vectors to binary vectors (such as by using a threshold transform, a discrete range transform, or a continuous range transform); a circuit/module 1324 configured for sending the binary vectors to the NVM die array 1301 for storage therein; a circuit/module 1325 configured for receiving a binary key vector from a host; a circuit/module 1326 configured for generating and sending a command sequence to an NVM die to control the die to identify any stored binary vectors that match the key vector. (e.g., with the key vector received, initially, from a host); and a circuit/module configured for receiving a notification of a match and for notifying the host. As explained above, in some examples, the host performs the conversion of floating-point vectors into binary vectors and, if so, the circuit/module 1320 is configured to receive binary vectors, and the apparatus need not include circuit/module 1322.

Insofar as the NVM die array 1301 is concerned, each die 1304 may include extra-array processing circuitry 1308 that includes: a circuit/module 1328 configured for storing the binary vectors along NAND block bitlines within NVM array 1306; a circuit/module 1329 configured for orientation conversion, e.g., horizontal to vertical (which may include striping the Nth dimension bit of every vector across the NAND wordlines); a circuit/module 1330 configured for receiving and executing the command sequence generated by circuit/module 1326; a circuit/module 1332 configured for incrementing (or, in some cases, decrementing) latch-based counters implemented using latches 1309; a circuit/module 1334 configured for incrementing (or, in some cases, decrementing) a per-bit counter using counter(s) 1311 (if provided); a circuit/module 1336 configured for detecting counter overflows (to, e.g., detect a match if some threshold number of counters overflow); and a circuit/module 1338 configured for notifying the controller 1300 of a match (e.g., by asserting a status line).

In at least some examples, means may be provided for performing the functions illustrated in FIG. 13 and/or other functions illustrated or described herein. For example, the means may include one or more of: means, such as circuit/module 1320, for receiving floating-point vector representations of an object such as representations of images (or, in other examples, fixed-point vector representations); means, such as circuit/module 1322, for converting the floating-point (or fixed-point) vectors to a binary vector (such as by using a threshold transform, a discrete range transform or a continuous range transform); means, such as a circuit/module 1324, for sending the binary vectors to the NVM array 1306 for storage therein; means, such as circuit/module 1325, for receiving a binary key vector from a host; means, such as circuit/module 1326, for generating and sending a command sequence to an NVM die to control the die to identify any stored binary vectors that match the key vector; means, such as circuit/module 1327, for circuit/module for receiving a notification of a match and for notifying the host; means, such as circuit/module 1328, for storing the binary vectors along NAND block bitlines within NVM array 1306; means, such as circuit/module 1329, for striping the Nth dimension bit of every vector across the NAND wordlines; means, such as circuit/module 1330, for receiving and executing the command sequence generated by circuit/module 1326; means, such as circuit/module 1332, for incrementing (or, in some cases, decrementing) latch-based counters implemented using latches 1309; means, such as circuit/module 1334, for incrementing (or, in some cases, decrementing) a per-bit counter using counter(s) 1311 (if provided); means, such as circuit/module 1336, for detecting counter overflows (to, e.g., detect a match if some threshold number of counters overflow); and means, such as circuit/module 1338, for notifying the controller 1300 of a match (e.g., by asserting a status line).

In yet another aspect of the disclosure, a non-transitory computer-readable medium is provided that has one or more instructions which when executed by a processing circuit in a DSD controller causes the controller to perform one or more of the data storage controller functions or operations listed above.

Exemplary Data Storage Device Die

In some aspects, an NVM die may be equipped with on-chip circuitry to, e.g., perform the conversion of floating-point vectors to binary vectors for storage in NAND blocks, receive a store a binary key vector, and compare the binary key vector to stored binary vectors. This section describes such as embodiment.

Figure 14:
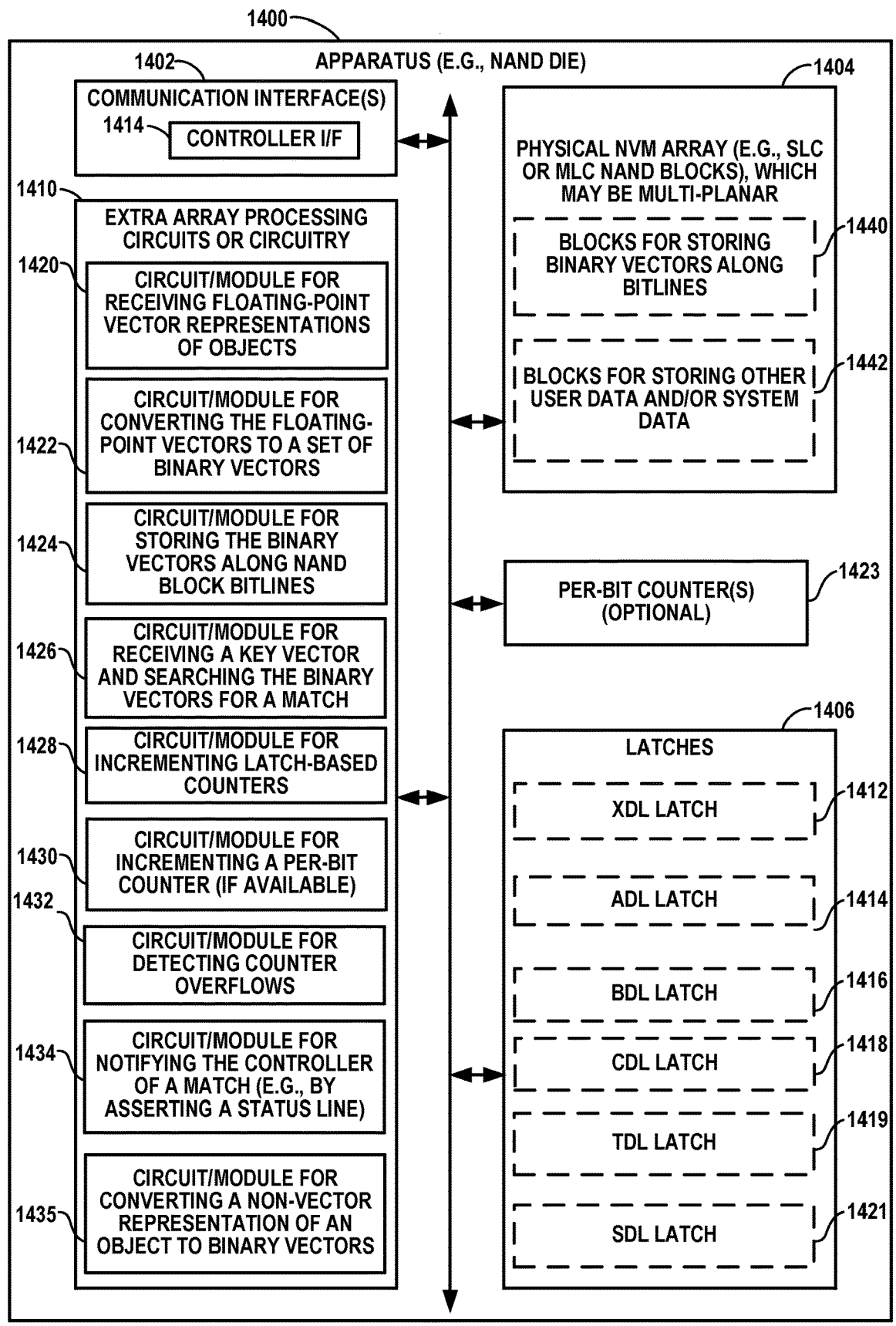
FIG. 14 is a schematic block diagram configuration for an exemplary apparatus such as a NVM die configured for generating and storing binary vectors, according to aspects of the present disclosure.

FIG. 14 illustrates an embodiment of an apparatus 1400 configured according to one or more aspects of the disclosure. The apparatus 1400, or components thereof, could embody or be implemented within a NVM die or some other type of NVM device that supports data storage. In various implementations, the apparatus 1400, or components thereof, could be a component of a processor, a controller, a computing device, a personal computer, a portable device, or workstation, a server, a personal digital assistant, a digital camera, a digital phone, an entertainment device, a medical device, a self-driving vehicle control device, or any other electronic device that stores, processes or uses objects such as images. (In some aspects, the apparatus is instead a volatile memory chip with a volatile memory data storage array.)

The apparatus 1400 includes a communication interface 1402, a physical memory array (e.g., NAND blocks) 1404, a set of latches 1406, and extra-array processing circuits or circuitry 1410 (e.g., circuitry formed on the same die that includes the NVM array). The NVM array 1404 may be a multi-planar array. Note that the latches 1406 may be components of sense amp circuitry connected to each bit line of the NVM array 1404. In the figure, the latches are shown separately for the sake of clarity and generality. These components can be coupled to and/or placed in electrical communication with one another via suitable components, represented generally by the connection lines in FIG. 14. Although not shown, other circuits such as timing sources, peripherals, voltage regulators, and power management circuits may be provided, which are well known in the art, and therefore, will not be described any further.

The communication interface 1402 provides a means for communicating with other apparatuses over a transmission medium. In some implementations, the communication interface 1402 includes circuitry and/or programming (e.g., a program) adapted to facilitate the communication of information bi-directionally with respect to one or more devices in a system. In some implementations, the communication interface 1402 may be configured for wire-based communication. For example, the communication interface 1402 could be a bus interface, a send/receive interface, or some other type of signal interface including circuitry for outputting and/or obtaining signals (e.g., outputting signal from and/or receiving signals into an SSD). The communication interface 1402 serves as one example of a means for receiving and/or a means for transmitting.

The physical memory array 1404 may represent one or more NAND blocks. The physical memory array 1404 may be used for storing data such as binary vectors representing images that are manipulated by the processing circuits 1410 or some other component of the apparatus 1400. The physical memory array 1404 may be coupled to the processing circuits 1410 (via, e.g., latches 1406) such that the processing circuits 1410 can read or sense information from, and write or program information to, the physical memory array 1404 (via, e.g., latches 1406). That is, the physical memory array 1404 can be coupled to the processing circuits 1410 so that the physical memory array 1404 is accessible by the processing circuits 1410. The latches 1406 may include one or more of: an XDL latch 1412; an ADL latch 1414; a BDL latch 1416; a CDL latch 1418, a TDL latch 1419, and an SDL latch 1421. Additionally, in some embodiments, one or more dedicated per-bit counters 1423 may be provided.

The processing circuits 1410 are arranged or configured to obtain, process and/or send data, control data access and storage, issue or respond to commands, and control other desired operations. For example, the processing circuits 1410 may be implemented as one or more processors, one or more controllers, and/or other structures configured to perform functions. In some embodiments, the processing circuits 1410 may include firmware.

According to one or more aspects of the disclosure, the processing circuits 1410 may be adapted to perform any or all of the features, processes, functions, operations and/or routines described herein. As used herein, the term "adapted" in relation to the processing circuit 1410 may refer to the processing circuits 1410 being one or more of configured, employed, implemented, and/or programmed to perform a particular process, function, operation and/or routine according to various features described herein. The processing circuits 1410 may include a specialized processor, such as an ASIC that serves as a means for (e.g., structure for) carrying out any one of the operations described in conjunction with the other figures. The processing circuits 1410 serves as one example of a means for processing. In various implementations, the processing circuits 1410 may provide and/or incorporate, at least in part, the functionality described above for the processing components of FIG. 2. Additionally, although not shown in FIG. 14, a circuit/module may be provided for striping the Nth dimension bit of every vector across the NAND wordlines. (See, for example, circuit/module 1329 of FIG. 13.

According to at least one example of the apparatus 1400, the processing circuitry 1410 may include one or more of: a circuit/module 1420 configured for receiving floating-point vector representations of an object such as representations of images (or, in other examples, fixed-point vector representations); a circuit/module 1422 configured for converting the floating-point (or fixed-point) vectors to a binary vector (such as by using a threshold transform, a discrete range transform or a continuous range transform); a circuit/module 1424 configured for storing the binary vectors along NAND block bitlines within NVM array 1404; a circuit/module 1426 configured for receiving a binary key vector and searching the binary vectors stored in the NVM array 1404 for a match; a circuit/module 1428 configured for incrementing (or, in some cases, decrementing) latch-based counters implemented using latches 1406; a circuit/module 1430 configured for incrementing (or, in some cases, decrementing) a per-bit counter using counter(s) 1423 (if provided); a circuit/module 1432 configured for detecting counter overflows (to, e.g., detect a match if some threshold number of counters overflow; a circuit/module 1434 configured for notifying the controller of a match (e.g., by asserting a status line); and a circuit/module 1435, for converting a non-vector representation of an object to binary vectors (if the object data initially received from the controller is not already in a vector format).

In at least some examples, means may be provided for performing the functions illustrated in FIG. 14 and/or other functions illustrated or described herein. For example, the means may include one or more of: means, such as circuit/module 1420, for receiving floating-point vector representations of an object such as representations of images (or, in other examples, fixed-point vector representations); means, such as circuit/module 1422, for converting the floating-point (or fixed-point) vectors to a binary vector (such as by using a threshold transform, a discrete range transform or a continuous range transform); means, such as a circuit/module 1424, for storing the binary vectors along NAND block bitlines within NVM array 1404; means, such as circuit/module 1426, for receiving a key vector and searching the binary vectors stored in the NVM array 1404 for a match; means, such as circuit/module 1428, for incrementing (or, in some cases, decrementing) latch-based counters implemented using latches 1406; means, such as circuit/module 1430, for incrementing (or, in some cases, decrementing) a per-bit counter using counter(s) 1423 (if provided); means, such as circuit/module 1432, for detecting counter overflows (to, e.g., detect a match if some threshold number of counters overflow; means, such as circuit/module 1434, for notifying the controller of a match (e.g., by asserting a status line); and means, such as circuit/module 1435, for converting a non-vector format representation of an object to binary vectors (if the object data initially received from the controller is not already in a vector format)

Additional Exemplary Methods and Embodiments

Figure 15:
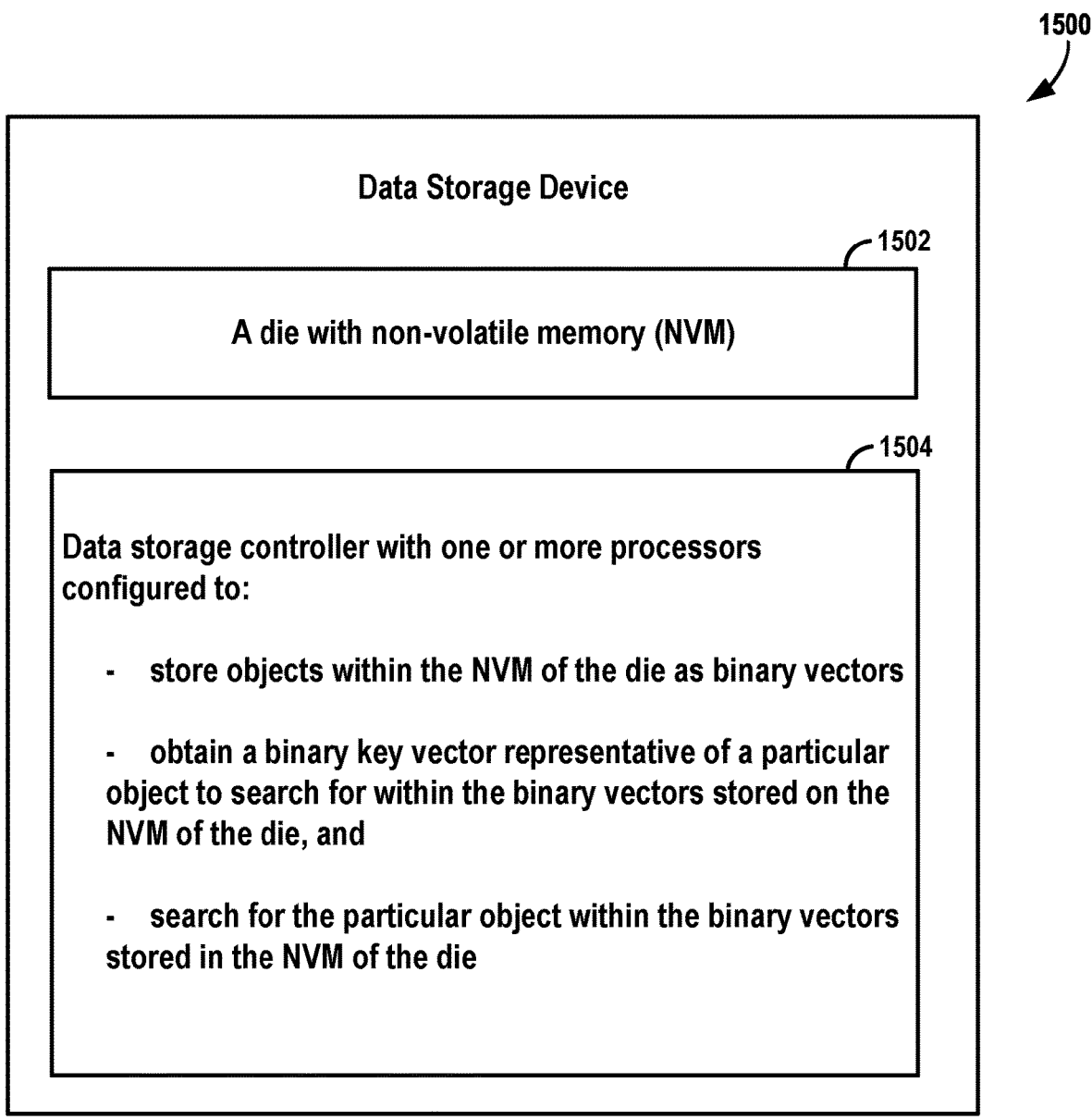
FIG. 15 is a schematic block diagram configuration for an exemplary data storage device configured for storing and searching binary vectors, according to aspects of the present disclosure.

FIG. 15 is a block diagram of an exemplary data storage device 1500 in accordance with some aspects of the disclosure. The data storage device 1500 includes: a die with an NVM array 1502 formed on the die; and a data storage controller 1504 that is coupled to the die and has processing circuit or one or more processors configured to: store objects within the NVM of the die as binary vectors, where, for example, the binary vectors are placed in bitlines of the NVM; obtain a binary key vector representative of a particular object to search for within the binary vectors stored on the NVM of the die; and search for the particular object within the binary vectors stored in the NVM of the die. Note that the term "search" in this figure and the following figures generally means to determine whether the particular object is found within the stored objects and can include various operations, such as performing the above-described conditional counting operations, comparing to thresholds, etc.

The objects may correspond, e.g., to images of an image database. The binary key vector may be obtained from a host. The search may be performed, e.g., by generating and sending a command sequence to the die to control the die to identify any stored binary vectors that match the key vector. For example, the data storage controller 1504 may be configured to send a sequence of commands to the die (or a suitable instruction), where the sequence of commands (or the instruction) is configured to cause the die to determine whether bits within the binary key vector match corresponding bits in one or more of the binary vectors of the NVM. The data storage controller 1504 then receives a notification from the die indicating a match between the binary key vector and one or more of the binary vectors of the NVM. The sequence of commands may include test commands configured to cause the die to perform one or more XNOR operations and other logic operations. (See the examples of FIGS. 11A and 11B.) Thus, as explained above, the data storage controller need not explicitly send '0's or '1's to the NVM die corresponding to the bits of the binary key vector. Rather, the data storage controller may send logic commands to the die that have the effect of causing the die to determine whether a bit of a bitline matches a '0' or a '1' of the binary key vector. Note also that more than one object may be found within the binary vectors stored in the NVM array that corresponds to the binary key vector, e.g., there may be more than one match. For further details of exemplary devices, see, e.g., the devices of FIGS. 2 and 13, described above.

Figure 16:
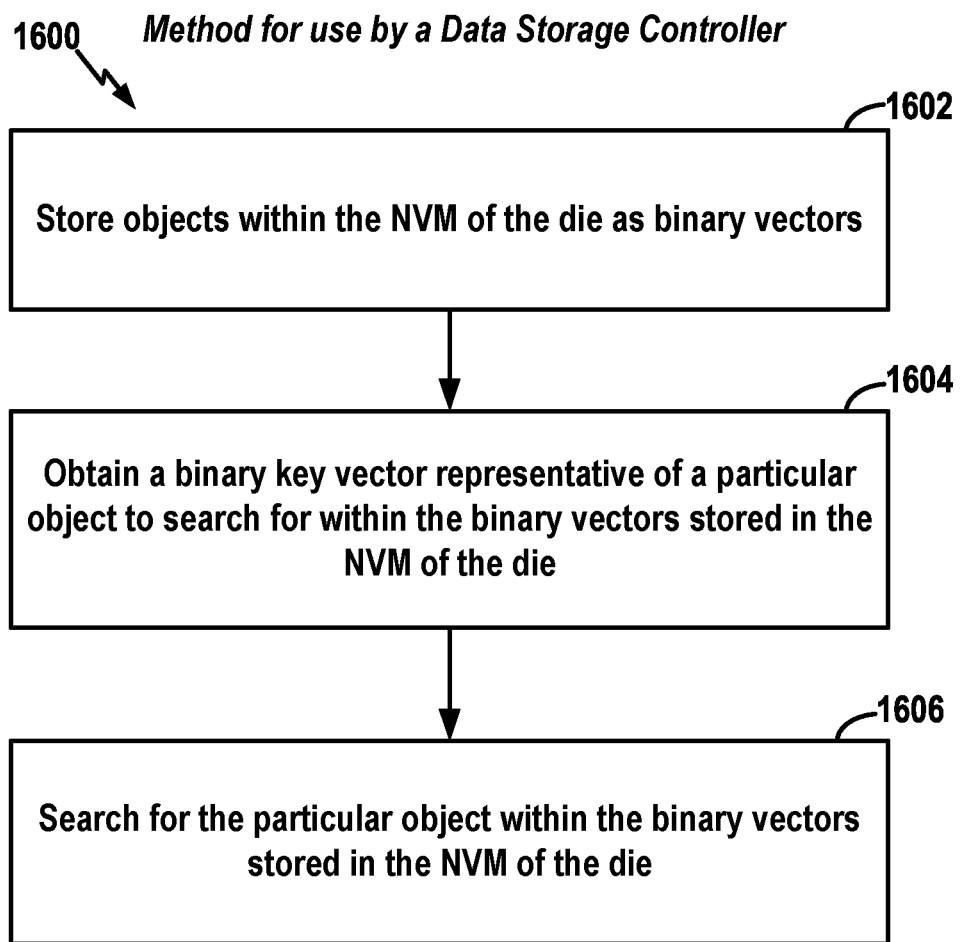
FIG. 16 is a flow chart of an exemplary method for use by a data storage device for storing and searching binary vectors, according to aspects of the present disclosure.

FIG. 16 illustrates a method or process 1600 in accordance with some aspects of the disclosure for use by a data storage controller of a data storage device having a die with NVM. At block 1602, the data storage controller stores objects within the NVM of the die as binary vectors (where the objects may correspond, e.g., to images of an image database). At block 1604, the data storage controller obtains a binary key vector representative of a particular object to search for within the binary vectors stored in the NVM of the die. The binary key vector may be obtained from a host. At block 1606, the data storage controller searches for the particular object within the binary vectors stored in the NVM of the die. As noted above, the search may be performed, e.g., by generating and sending a command sequence to the die to cause the die to determine whether bits within the binary key vector match corresponding bits within one or more of the binary vectors of the NVM. More than one object may be found within the binary vectors stored in the NVM array that corresponds to the key vector, e.g., there may be more than one match. For further details of exemplary methods see, for example, the methods of FIGS. 9-12, described above.

Figure 17:
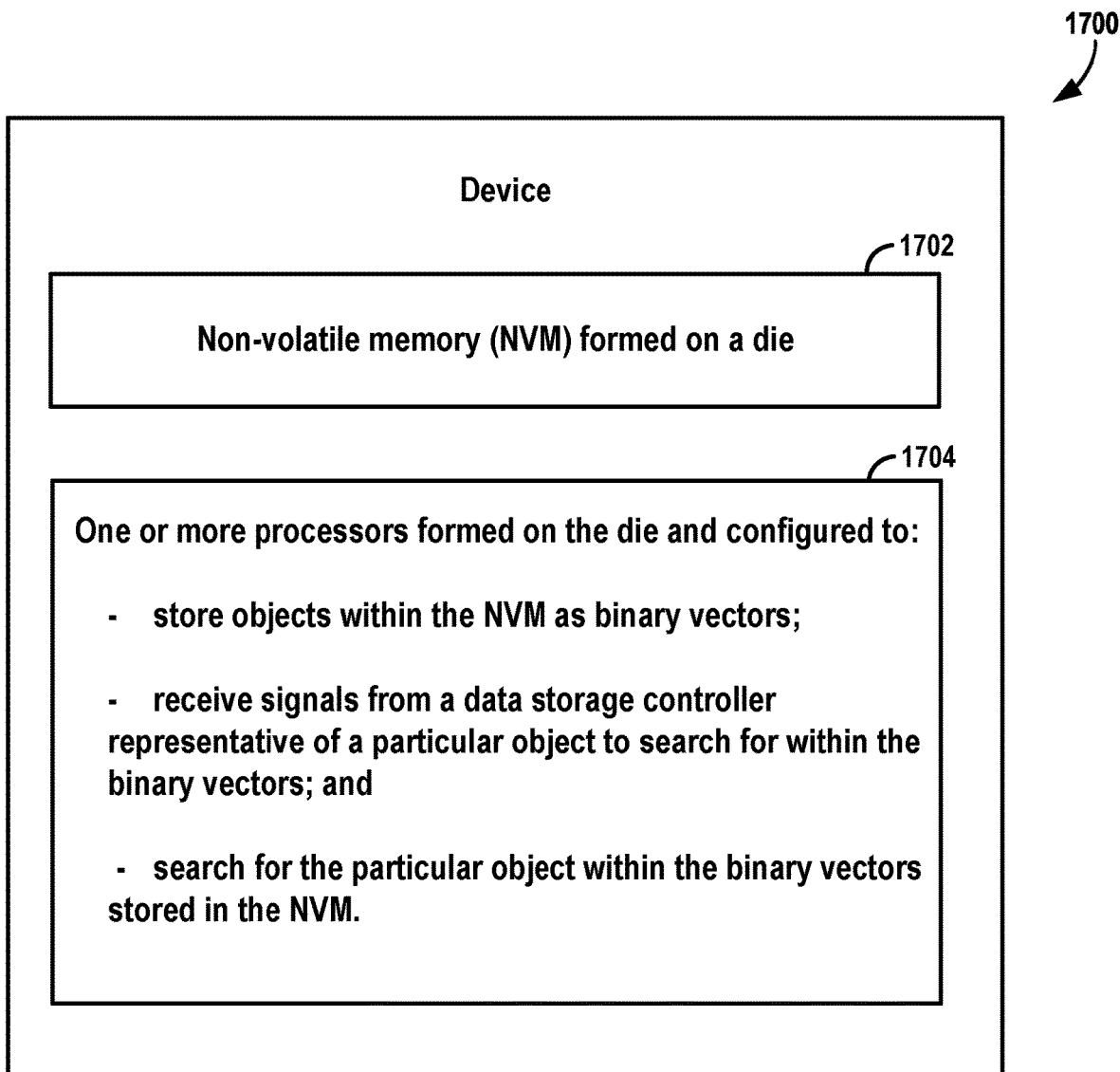
FIG. 17 is a schematic block diagram configuration for a device with one or more processors formed on a die, with the one or more processors configured for storing and searching binary vectors, according to aspects of the present disclosure.

FIG. 17 is a block diagram of an exemplary device 1700 in accordance with some aspects of the disclosure. The device 1700 (which may be a NAND die) includes: NVM 1702 formed on a die; and a processing circuit or one or more processors 1704 formed on the die and configured to: store objects within the NVM as binary vectors; receive signals from a data storage controller representative of a particular object to search for within the binary vectors; and search for the particular object within the binary vectors stored in the NVM. The signals may be, e.g., a sequence of commands (or an instruction) configured to cause the die to determine whether bits within a binary key vector (maintained in the data storage controller) match corresponding bits in one or more of the binary vectors of the NVM. The search may be performed by executing the sequence of instructions. For further details of exemplary devices, see, e.g., the devices of FIGS. 2 and 13, described above.

Figure 18:
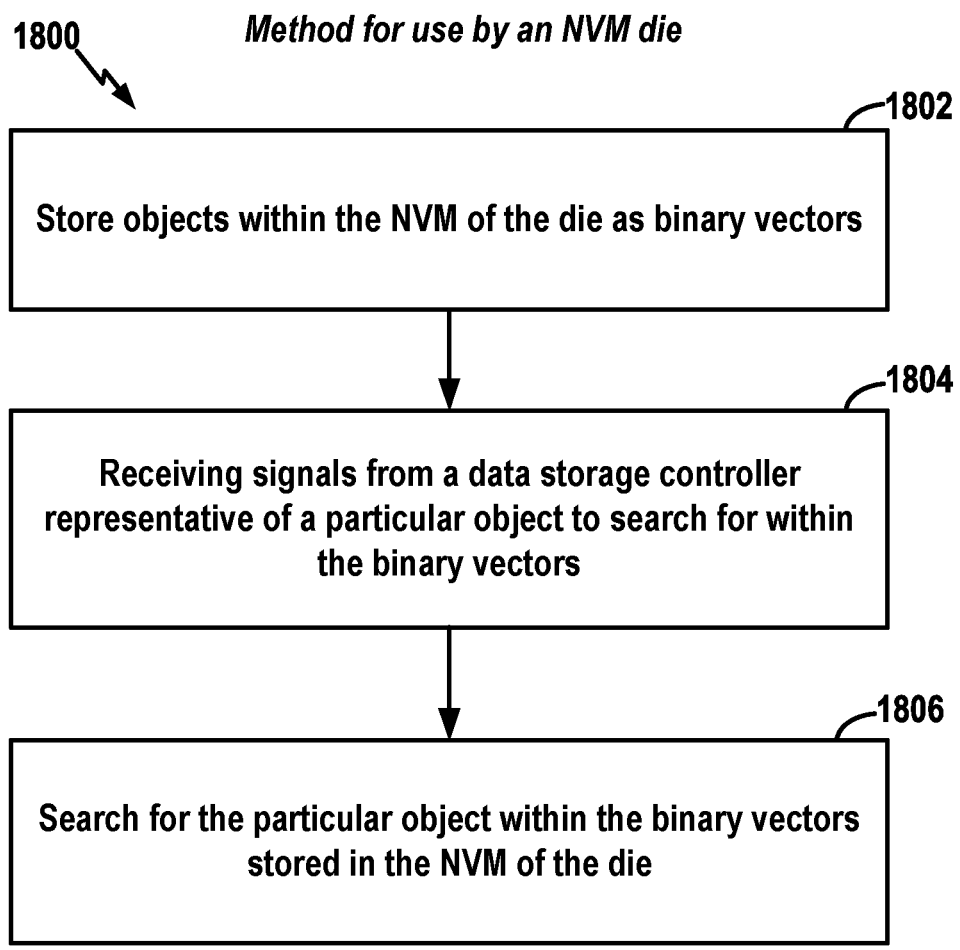
FIG. 18 is a flow chart of an exemplary method for use by a device with one or more processors formed on a die for storing and searching binary vectors, according to aspects of the present disclosure.

FIG. 18 illustrates a method or process 1800 in accordance with some aspects of the disclosure for use by a die with NVM. At block 1802, the device stores objects within the NVM of the die as binary vectors (where the objects may correspond, e.g., to images of an image database). At block 1804, the device receives signals from a data storage controller representative of a particular object to search for within the binary vectors. The signals may be, e.g., a sequence of commands (or an instruction) configured to cause the die to determine whether bits within a binary key vector (maintained in the data storage controller) match corresponding bits in one or more of the binary vectors of the NVM. At block 1806, the device searches for the object within the binary vectors stored in the NVM of the die. The search may be performed by executing the sequence of instructions. For further details of exemplary methods see, for example, the methods of FIGS. 9-12, described above.

Figure 19:
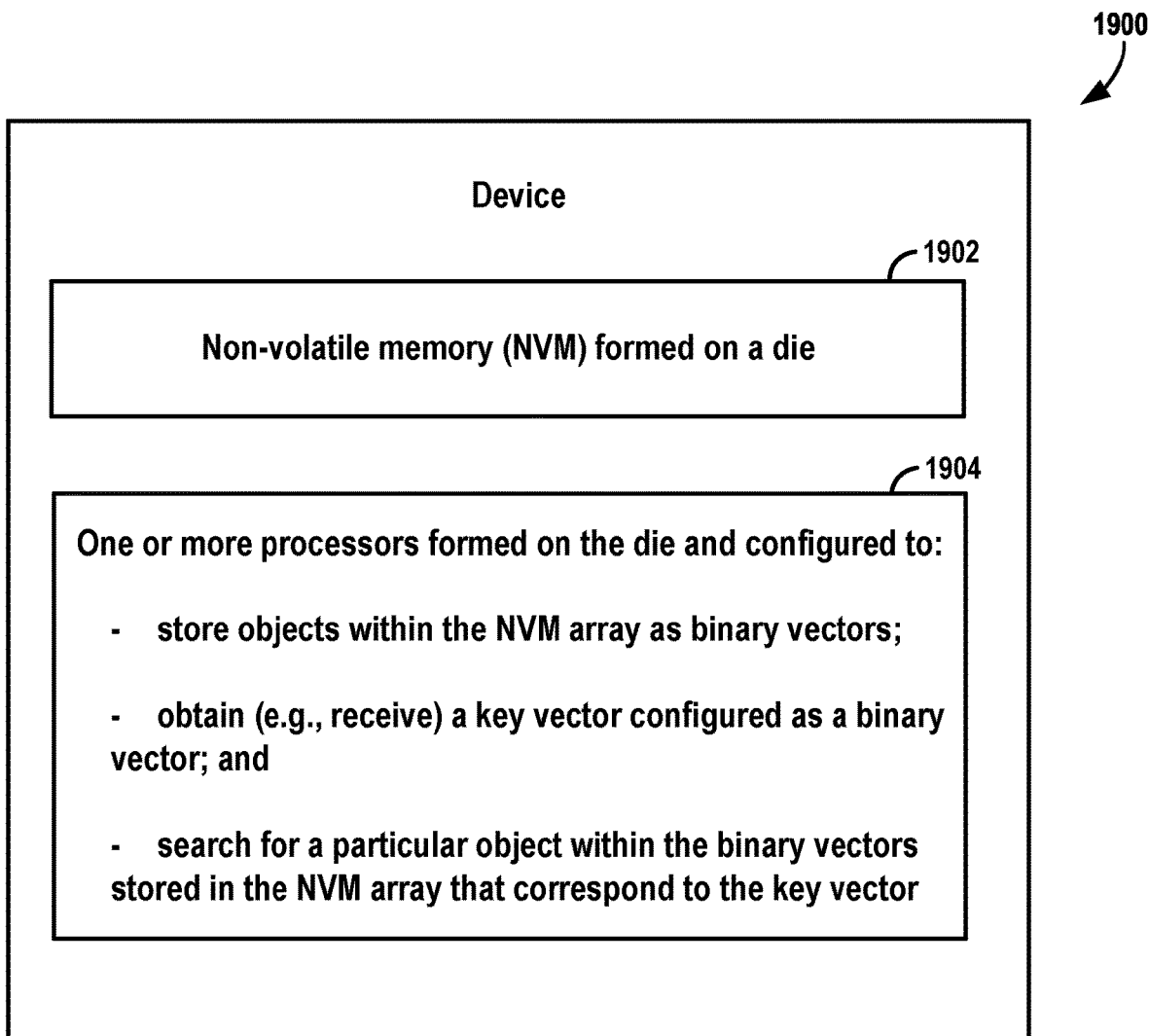
FIG. 19 is a schematic block diagram configuration for an exemplary apparatus such as a NVM die configured for processing and storing binary vectors, such as by converting a floating-point vector to a binary vector, according to aspects of the present disclosure.

FIG. 19 is a block diagram of another exemplary device 1900 in accordance with some aspects of the disclosure. The device 1900 (which may be a NAND die) includes: an NVM 1902 formed on a die; and a processing circuit or one or more processors 1904 formed on the die and configured to: store objects within the NVM array as binary vectors; obtain a key vector configured as a binary vector; and search for a particular object within the binary vectors stored in the NVM array that corresponds to the key vector. The objects may correspond, e.g., to images of an image database. The key vector may be obtained by receiving a binary vector from a controller or receiving a non-binary vector from the controller (e.g., a floating-point vector) and then converting the non-binary vector to a binary vector. Note that more than one object may be found within the binary vectors stored in the NVM array that corresponds to the key vector, e.g., there may be more than one match. For further details of exemplary devices, see, for example, the device of FIG. 14, described above.

Figure 20:
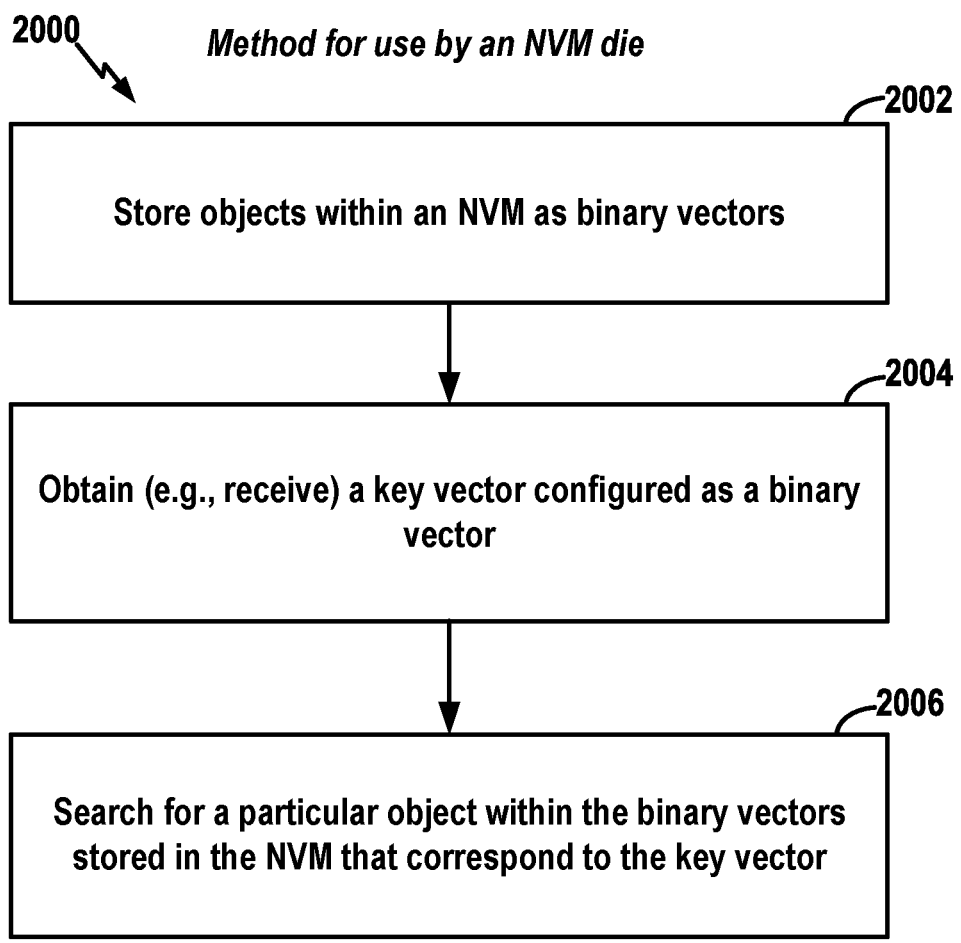
FIG. 20 is a flow chart of another exemplary method for processing and storing binary vectors, such as by converting a floating-point vector to a binary vector, according to aspects of the present disclosure.

FIG. 20 illustrates a method or process 2000 in accordance with some aspects of the disclosure for use by a device formed on a die having an NVM array, such as by an extra-array circuit formed on the NVM die (e.g., a NAND die). See, for example, the device of FIGS. 14 and 19, described above. At block 2002, the device stores objects within the NVM as binary vectors (where the objects may correspond, e.g., to images of an image database). At block 2004, the device obtains a key vector configured as a binary vector. The key vector may be obtained by receiving a binary vector from a controller or receiving a non-binary vector from the controller (e.g., a floating-point vector) and then converting the non-binary vector to a binary vector. At block 2006, the device searches for a particular object within the binary vectors stored in the NVM that corresponds to the key vector. Note again that more than one object may be found within the binary vectors stored in the NVM that corresponds to the key vector, e.g., there may be more than one match.

Figure 21:
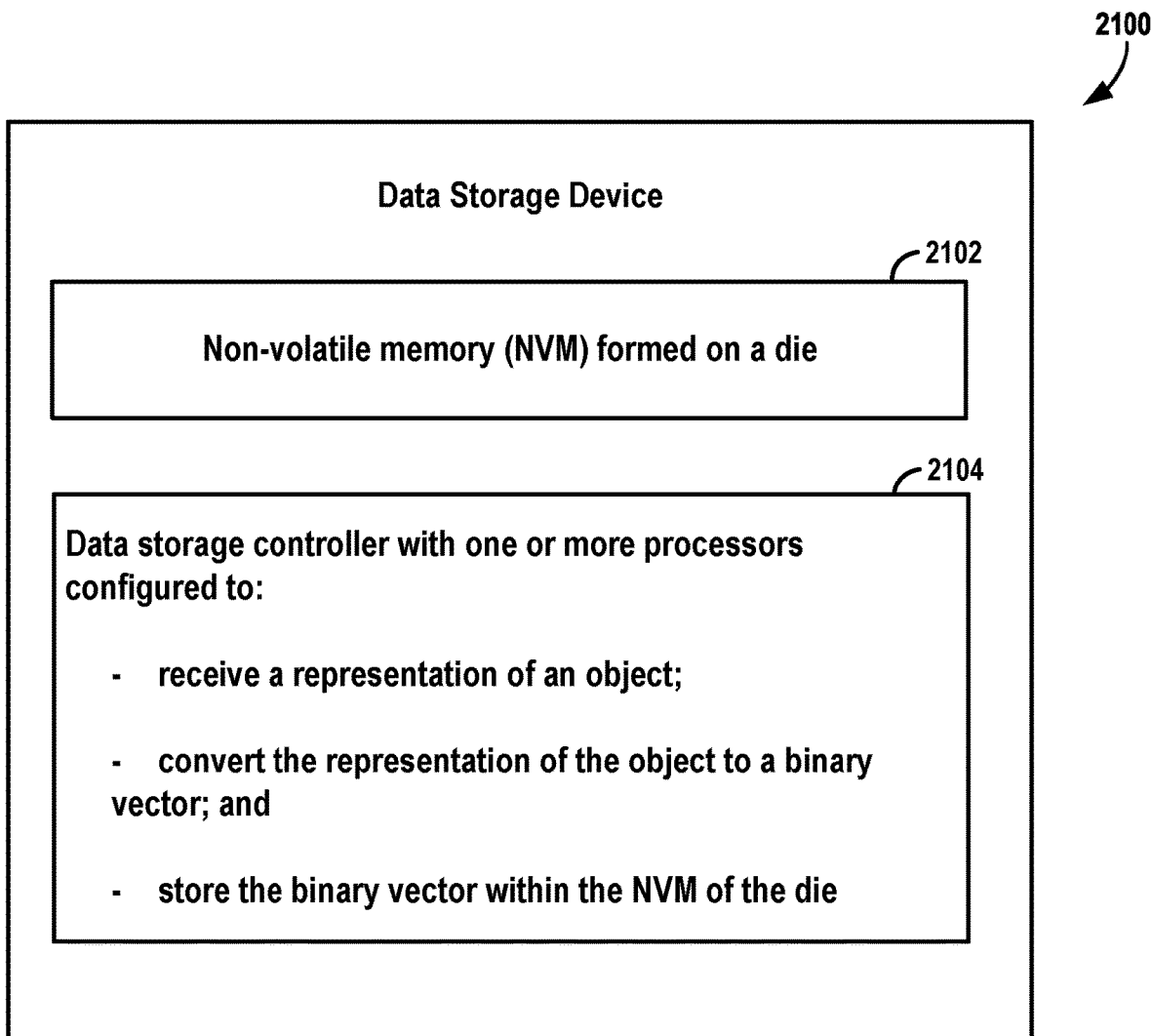
FIG. 21 is a schematic block diagram configuration for another exemplary apparatus such as an NVM device configured for storing and searching binary vectors, according to aspects of the present disclosure.

FIG. 21 is a block diagram of an exemplary data storage device 2100 in accordance with some aspects of the disclosure. The data storage device 2100 includes: NVM 2102 formed on a die; and a processing circuit or one or more processors 2104 configured to: receive a representation of an object (e.g., receiving a floating-point vector representation of an image from a host); convert the representation of the object to a binary vector (e.g., by employing a discrete range or continuous range transform, etc.); and store the binary vector within the NVM of the die (to, e.g., enable subsequent searching via a binary key vector). For further details of exemplary data storage devices, see, e.g., the devices of FIGS. 2 and 13, described above.

Figure 22:
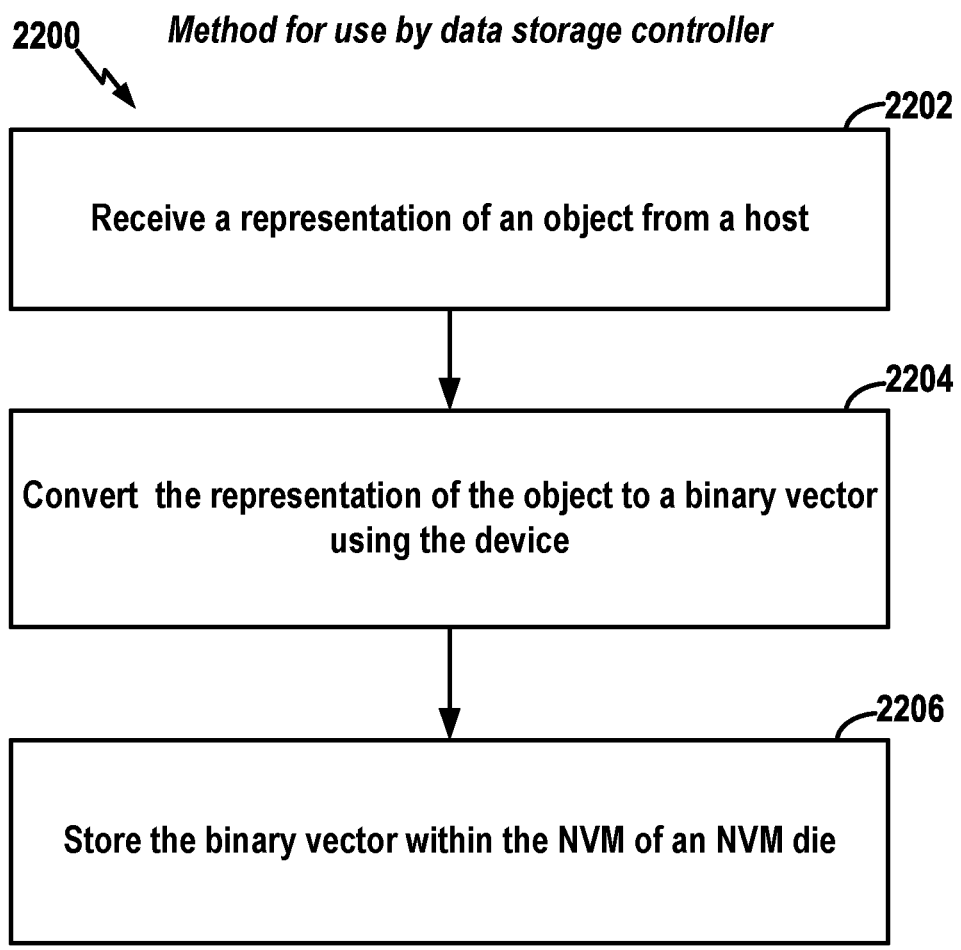
FIG. 22 is a schematic block diagram configuration for another exemplary apparatus such as a volatile memory device configured for processing and storing binary vectors, such as by converting a floating-point vector to a binary vector, according to aspects of the present disclosure.

FIG. 22 illustrates a method or process 2200 in accordance with some aspects of the disclosure for use by a data storage controller coupled to a die having NVM. See, for example, the device of FIG. 13, described above. At block 2202, the data storage controller receives a representation of an object (e.g., receiving a floating-point vector representation of an image from a host). At block 2204, the data storage controller converts the representation of the object to a binary vector (e.g., by employing a discrete range or continuous range transform, etc.). At block 2206, the data storage controller stores the binary vectors within the NVM of an NVM die (to, e.g., enable subsequent searching via a binary key vector). Note that the figure provides only a high level summary. Additional operations may be performed. For example, between blocks 2204 and 2206, the binary vectors may be held in a volatile memory before the vectors are programed/stored along the bitlines of NVM. For further details of exemplary methods see, for example, the transforms of FIGS. 5A, 5B and 6.

As noted above, the features described herein are not limited to NVM devices. The following summarizes an embodiment wherein a volatile memory chip is instead provided.

Figure 23:
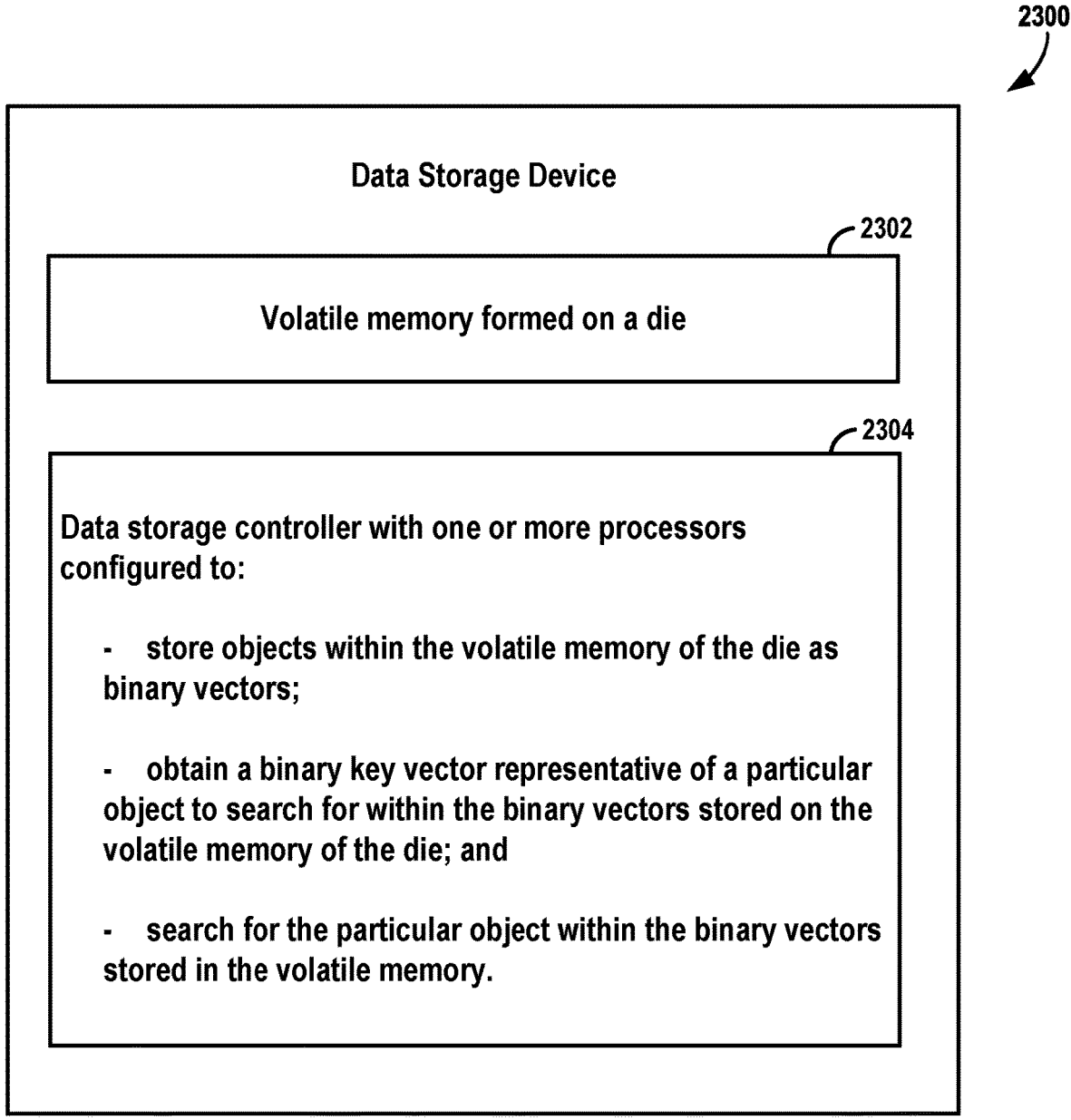
FIG. 23 is a schematic block diagram configuration for another exemplary apparatus such as a volatile memory device configured for processing and storing binary vectors, according to aspects of the present disclosure.

FIG. 23 is a block diagram of an exemplary data storage device 2300 in accordance with some aspects of the disclosure. The data storage device 2300 includes: volatile memory 2302 formed on a die; and a processing circuit or one or more processors 2304 configured to: store objects within the volatile memory of the die as binary vectors; obtain a binary key vector representative of a particular object to search for within the binary vectors stored on the volatile memory of the die; and search for the particular object within the binary vectors stored in the volatile memory.

Figure 24:
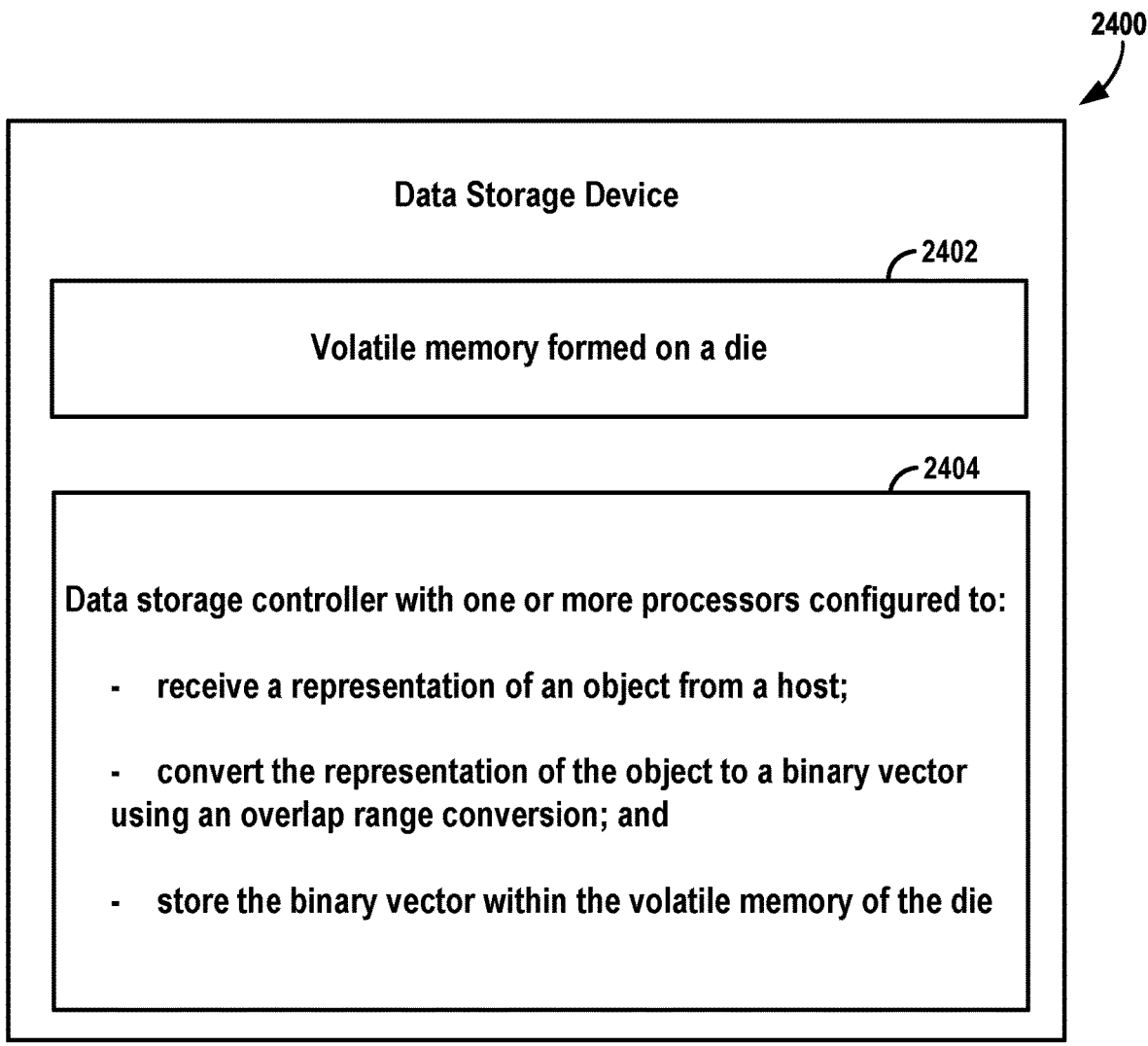
FIG. 24 is a schematic block diagram configuration for another exemplary apparatus such as a volatile memory device configured for converting objects into binary vectors, according to aspects of the present disclosure.

FIG. 24 is a block diagram of an exemplary data storage device 2400 in accordance with some aspects of the disclosure. The data storage device 2400 includes: volatile memory 2402 formed on a die; and a processing circuit or one or more processors 2404 configured to: receive a representation of an object (e.g., receiving a floating-point vector representation of an image from a host); convert the representation of the object to a binary vector using, e.g., an overlap range transform; and store the binary vector within the volatile memory of the die.

Additional Aspects

Aspects of the subject matter described herein can be implemented in any suitable NAND flash memory, such as 3D NAND flash memory. Semiconductor memory devices include volatile memory devices, such as DRAM) or SRAM devices, NVM devices, such as ReRAM, EEPROM, flash memory (which can also be considered a subset of EEPROM), ferroelectric random access memory (FRAM), and MRAM, and other semiconductor elements capable of storing information. See, also, 3D XPoint (3DXP)) memories. Each type of memory device may have different configurations. For example, flash memory devices may be configured in a NAND or a NOR configuration.

Regarding the application of the features described herein to other memories besides NAND: NOR, 3DXP, PCM, and ReRAM have page-based architectures and programming processes that usually require operations such as shifts, XORs, ANDs, etc. If such devices do not already have latches (or their equivalents), latches can be added to support the latch-based operations described herein. Note also that latches can have a small footprint relative to the size of a memory array as one latch can connect to many thousands of cells, and hence adding latches does not typically require much circuit space.

The memory devices can be formed from passive and/or active elements, in any combination. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bitline and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate that is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bitlines and word lines.

A three-dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the z direction) with each column having multiple memory elements in each column. The columns may be arranged in a two-dimensional configuration, e.g., in an x-y plane, resulting in a three-dimensional arrangement of memory elements with elements on multiple vertically stacked memory planes. Other configurations of memory elements in three dimensions can also constitute a three-dimensional memory array.

By way of a non-limiting example, in a three-dimensional NAND memory array, the memory elements may be coupled together to form a NAND string within a single horizontal (e.g., x-y) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements that span through multiple memory levels. Three-dimensional memory arrays may also be designed in a NOR configuration and a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but covers all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer-readable medium having stored thereon computer-executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer-readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage device, comprising:
   a die comprising non-volatile memory (NVM); and
   a data storage controller coupled to the die, the data storage controller comprising one or more processors configured to:
   store objects within the NVM of the die as binary vectors;
   obtain a binary key vector representative of a particular object to search for within the binary vectors stored on the NVM of the die; and
   search for the particular object within the binary vectors stored in the NVM by sending one or more instructions or commands to the die that are configured to:
   determine whether bits within the binary key vector match corresponding bits within a binary vector stored in the NVM;
   control a counter of the die to count a number of bits within the binary vector that match corresponding bits in the binary key vector; and
   notify the data storage controller in response to the counter exceeding a threshold count representative of a match between the binary key vector and the binary vector of the NVM.

2. The data storage device of claim 1, wherein the one or more instructions or commands are configured to cause the die to perform one or more exclusive NOR (XNOR) operations.

3. The data storage device of claim 1, wherein the one or more processors are further configured to receive the objects as binary vectors from a host for storing in the NVM of the die.

4. The data storage device of claim 1, wherein the one or more processors are further configured to store the binary vectors along bitlines of the NVM.

5. The data storage device of claim 1, wherein counter comprises a latch-based counter or a per-bit counter circuit.

6. The data storage device of claim 1, wherein the counter is one of a plurality of counters of the die, and wherein the one or more processors are further configured to:
   count a number of the counters that overflow;
   compare the count of the number of counters that overflow to a counter overflow threshold; and
   generate an indicator in response to the count exceeding the counter overflow threshold.

7. A method for use by a data storage controller of a data storage device having a die with non-volatile memory (NVM), the method comprising:
   storing objects within the NVM of the die as binary vectors;
   obtaining a binary key vector representative of a particular object to search for within the binary vectors stored in the NVM of the die; and
   searching for the particular object within the binary vectors stored in the NVM of the die by sending one or more instructions or commands to the die that control the die to:
   determine whether bits within the binary key vector match corresponding bits within a binary vector stored in the NVM;
   control a counter of the die to count a number of bits within the binary vector that match corresponding bits in the binary key vector; and
   notify the data storage controller in response to the counter exceeding a threshold count representative of a match between the binary key vector and the binary vector of the NVM.

8. The method of claim 7, wherein the one or more instructions or commands causes the die to perform one or more exclusive NOR (XNOR) operations.

9. The method of claim 7, wherein the one or more instructions or commands are configured to control the die to:
   sense all bits of a bitline of the NVM that stores one of the binary vectors; and
   compare all bits of the sensed bitline to corresponding bits of the binary key vector.

10. The method of claim 7, wherein the one or more instructions or commands are configured to control the die to:

sense only a portion of the bits of a bitline of the NVM that stores one of the binary vectors; and compare the portion of bits to corresponding bits of the binary key vector.

11. The method of claim 10, wherein the data storage controller randomly selects the portion of bits to be sensed.

12. The method of claim 10, wherein the data storage controller selects the portion of bits to be sensed based on bit values of the binary key vector.

13. The method of claim 7, further comprising receiving the objects as binary vectors from a host for storing in the NVM of the die.

14. The method of claim 7, wherein storing objects within the NVM of the die as binary vectors comprises storing the binary vectors along bitlines of the NVM.

15. The method of claim 7, wherein counter comprises a latch-based counter or a per-bit counter circuit.

16. The method of claim 7, wherein the counter is one of a plurality of counters of the die, and wherein the method further comprises:
counting a number of the counters that overflow;
comparing the count of the number of counters that overflow to a counter overflow threshold; and
generating an indicator in response to the count exceeding the counter overflow threshold.

17. A device, comprising:
a die comprising non-volatile memory (NVM); and
one or more processors formed on the die and configured to:
store objects within the NVM as binary vectors;
receive signals from a data storage controller representative of a particular object to search for within the binary vectors including receiving one or more instructions or commands configured to control the one or more processors of the die to determine whether bits within a binary key vector corresponding to the particular object match corresponding bits within a binary vector stored in the NVM;
search for the particular object within the binary vectors stored in the NVM by executing the one or more instructions or commands while incrementing a counter of the die to count a number of bits within the binary vector that match corresponding bits in the binary key vector; and
notify the data storage controller in response to the counter exceeding a threshold count representative of a match between the binary key vector and the binary vector in the NVM.

18. The device of claim 17, wherein the one or more processors are further configured to store the binary vectors along bitlines of the NVM.

19. The device of claim 18, wherein the one or more processors are further configured to store an individual binary vector of a plurality of the binary vectors using an entire bitline or only a portion of a bitline.

20. The device of claim 17, wherein the NVM comprises multiple blocks and wherein the one or more processors are further configured to store an individual binary vector of a plurality of the binary vectors using an entire block, only a fraction of a block, or multiple blocks.

21. The device of claim 17, wherein the NVM comprises single-level cell (SLC) memory and wherein the binary vectors are stored in the SLC memory.

22. The device of claim 17, wherein the NVM comprises multi-level cell (MLC) memory and wherein the binary vectors are stored in the MLC memory.

23. The device of claim 17, wherein the counter comprises a latch-based counter or a per-bit counter circuit.

24. The device of claim 17, wherein the counter is one of a plurality of counters on the die, and wherein the one or more processors are further configured to:
count a number of the counters that overflow;
compare the count of the number of counters that overflow to a counter overflow threshold; and
generate an indicator in response to the count exceeding the counter overflow threshold.

25. A method for use by a die having non-volatile memory (NVM), the method comprising:
storing objects within the NVM as binary vectors;
receiving signals from a data storage controller representative of a particular object to search for within the binary vectors including receiving one or more instructions or commands configured to control the die to determine whether bits within a binary key vector corresponding to the particular object match corresponding bits within a binary vector stored in the NVM;
searching for the particular object within the binary vectors stored in the NVM by executing the one or more instructions or commands while incrementing a counter of the die to count a number of bits within the binary vector that match corresponding bits in the binary key vector; and
notifying the data storage controller in response to the counter exceeding a threshold count representative of a match between the binary key vector and the binary vector in the NVM.

26. The method of claim 25, wherein the binary vectors are stored along bitlines of the NVM.

27. The method of claim 25, wherein storing objects within the NVM of the die as binary vectors comprises storing the binary vectors along bitlines of the NVM.

28. The method of claim 25, wherein counter comprises a latch-based counter or a per-bit counter circuit.

29. The method of claim 25, wherein the counter is one of a plurality of counters of the die, and wherein counting the number of bits within the binary vector that match corresponding bits in the binary key vector further comprises:
counting a number of the counters that overflow;
comparing the count of the number of counters that overflow to a counter overflow threshold; and
generating an indicator in response to the count exceeding the counter overflow threshold.

30. An apparatus for use with a die having non-volatile memory (NVM), the apparatus comprising:
means for storing objects within the NVM of the die as binary vectors;
means for obtaining a binary key vector representative of a particular object to search for within the binary vectors stored in the NVM of the die; and
means for searching for the particular object within the binary vectors stored in the NVM of the die by sending one or more instructions or commands to the die that are configured to control the die to:
determine whether bits within the binary key vector match corresponding bits within a binary vector stored in the NVM;
control a counter of the die to count a number of bits within the binary vector that match corresponding bits in the binary key vector; and
notify a data storage controller of the apparatus in response to the counter exceeding a threshold count representative of a match between the binary key vector and the binary vector of the NVM.

31. The apparatus of claim 30, wherein the means for storing objects within the NVM as binary vectors comprises means for storing binary vectors along bitlines of the NVM.

* * * * *